US011197199B2

(12) United States Patent
Ode et al.

(10) Patent No.: US 11,197,199 B2
(45) Date of Patent: *Dec. 7, 2021

(54) BASE STATION, CONTROL APPARATUS, WIRELESS TERMINAL, AND WIRELESS COMMUNICATION SYSTEM

(71) Applicant: FUJITSU LIMITED, Kawasaki (JP)

(72) Inventors: Takayoshi Ode, Yokohama (JP); Junichi Takagi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,599

(22) Filed: Apr. 24, 2020

(65) Prior Publication Data
US 2020/0252836 A1 Aug. 6, 2020

Related U.S. Application Data

(63) Continuation of application No. 16/189,401, filed on Nov. 13, 2018, now Pat. No. 10,694,426, which is a
(Continued)

(51) Int. Cl.
H04W 28/18 (2009.01)
H04W 4/24 (2018.01)
(Continued)

(52) U.S. Cl.
CPC ......... *H04W 28/18* (2013.01); *H04L 12/1407* (2013.01); *H04M 15/66* (2013.01);
(Continued)

(58) Field of Classification Search
CPC ....... H04W 28/18; H04W 8/08; H04W 88/08; H04W 88/14; H04M 15/66
See application file for complete search history.

(56) References Cited

U.S. PATENT DOCUMENTS

2004/0082364 A1 4/2004 Kitazawa et al.
2004/0224676 A1 11/2004 Iseki
(Continued)

FOREIGN PATENT DOCUMENTS

JP 2003-244269 A 8/2003
JP 2012-119810 A 6/2012
(Continued)

OTHER PUBLICATIONS

Communication pursuant to Article 94(3) EPC issued by the European Patent Office for corresponding European Patent Application No. 16 902 398.3-1215, dated Mar. 24, 2021.
(Continued)

*Primary Examiner* — Jamal Javaid
*Assistant Examiner* — Ryan C Kavleski
(74) *Attorney, Agent, or Firm* — Myers Wolin, LLC

(57) ABSTRACT

A control apparatus includes: a network interface configured to perform transmission and reception of a signal; a controller coupled to the network interface, the controller configured to execute transfer processing that includes transferring service class information indicating a service class for controlling a remote device, execute setting processing that includes setting the service class to transmission of an operation signal for controlling the remote device, and execute control processing that includes controlling transfer of the operation signal via the network interface by using the service class. The control processing is configured to control transfer of the operation signal by using the service class that is set to the operation signal and information that is associated with the operation signal. The information relates to a first attribute value different from a value of at least one attribute associated with the service class.

3 Claims, 39 Drawing Sheets

Related U.S. Application Data continuation of application No. PCT/JP2016/064784, filed on May 18, 2016.

(51) Int. Cl.

| | | |
|---|---|---|
| *H04L 12/14* | (2006.01) | |
| *H04M 15/00* | (2006.01) | |
| *H04W 28/24* | (2009.01) | |
| *H04W 8/08* | (2009.01) | |
| *H04W 60/00* | (2009.01) | |
| *H04L 12/851* | (2013.01) | |
| *H04W 80/02* | (2009.01) | |
| *H04W 88/08* | (2009.01) | |
| *H04W 88/14* | (2009.01) | |

(52) U.S. Cl.
CPC ......... *H04M 15/8016* (2013.01); *H04W 4/24* (2013.01); *H04W 8/08* (2013.01); *H04W 28/24* (2013.01); *H04L 47/24* (2013.01); *H04W 60/00* (2013.01); *H04W 80/02* (2013.01); *H04W 88/08* (2013.01); *H04W 88/14* (2013.01)

(56) References Cited

U.S. PATENT DOCUMENTS

| | | |
|---|---|---|
| 2010/0265823 A1 | 10/2010 | Zhao et al. |
| 2015/0138352 A1 | 5/2015 | Itoh et al. |
| 2016/0112895 A1 | 4/2016 | Ode et al. |
| 2016/0192261 A1 | 6/2016 | Wang et al. |
| 2017/0245178 A1 | 8/2017 | Nobukiyo et al. |
| 2017/0293295 A1 | 10/2017 | Tani |
| 2019/0132867 A1* | 5/2019 | Karapantelakis ............ H04W 72/0446 |

FOREIGN PATENT DOCUMENTS

| | | |
|---|---|---|
| JP | 2015-510377 A | 4/2015 |
| JP | 2015-100075 A | 5/2015 |
| JP | 2016-5228 A | 1/2016 |
| JP | 2016-71585 A | 5/2016 |
| WO | 2013/138031 A1 | 9/2013 |
| WO | 2014/207930 A1 | 12/2014 |
| WO | 2016/068316 A1 | 5/2016 |

OTHER PUBLICATIONS

3GPP TS 23.203 V1 3.7.0, "3rd Generation Partnership Project; Technical Specification Group Services and System Aspects; Policy and charging control architecture (Release 13)", Mar. 2016.

3GPP TS 23.107 V13.0.0, "3rd Generation Partnership Project; Technical Specification Group Services and System Aspects; Quality of Service (QoS) concept and architecture (Release 13)", Dec. 2015.

3GPP TS 36.321 V13.0.0, "3rd Generation Partnership Project; Technical Specification Group Radio Access Network; Evolved Universal Terrestrial Radio Access (E-UTRA); Medium Access Control (MAC) protocol specification (Release 13)", Dec. 2015.

Nishida et al., "Basic SAE Management Technology for Realizing ALL-IP Network", NTT DOCOMO Technical Journal, vol. 17, No. 3, [online], [retrieved on Mar. 22, 2016], Retrieved from the Internet: <URL:https://www.nttdocomo.co.jp/binary/pdf/corporate/technology/rd/technical_journal/bn/vol17_3/vol17_3_006jp.pdf>, pp. 6-14, with English version.

Tanaka et al., "Overview of GSMA VoLTE Profile", NTT docomo technical journal, vol. 19, No. 4, [online], [retrieved on Mar. 22, 2016], Retrieved from the Internet: <URL:https://www.nttdocomo.co.jp/binary/pdf/corporate/technology/rd/technical_journal/bn/vol19_4/vol19_4_045jp.pdf>, pp. 45-50, with English version.

International Search Report issued by the Japan Patent Office for corresponding International Patent Application No. PCT/JP2016/064784, dated Aug. 9, 2016, with an English translation.

Written Opinion of the International Searching Authority issued by the Japan Patent Office for corresponding International Patent Application No. PCT/JP2016/064784, dated Aug. 9, 2016, with an English translation.

Frodigh et al., "Future-Generation Wireless Networks", IEEE Personal Communications, IEEE Communications Society, vol. 8, Issue 5, pp. 10-17, Oct. 2001.

Extended European search report with supplementary European search report and the European search opinion issued by the European Patent Office for corresponding European Patent Application No. 16902398.3-1215, dated Apr. 3, 2019.

Non-Final Office Action issued by the United States Patent and Trademark Office for corresponding U.S. Appl. No. 16/189,401, dated Feb. 13, 2019.

Final Office Action issued by the United States Patent and Trademark Office for corresponding U.S. Appl. No. 16/189,401, dated Aug. 12, 2019.

Advisory Action Before the Filing of an Appeal Brief issued by the United States Patent and Trademark Office for corresponding U.S. Appl. No. 16/189,401, dated Nov. 25, 2019.

Non-Final Office Action issued by the United States Patent and Trademark Office for corresponding U.S. Appl. No. 16/189,401, dated Jan. 3, 2020.

Notice of Allowance issued by the United States Patent and Trademark Office for corresponding U.S. Appl. No. 16/189,401, dated Mar. 20, 2020.

Notice of Reasons for Refusal issued by the Japan Patent Office for corresponding Japanese Patent Application No. 2018-518007, dated Apr. 28, 2020, with a full English machine translation.

* cited by examiner

FIG. 5

| TRAFFIC CLASS | CONVERSATIONAL CLASS | STREAMING CLASS | INTERACTIVE CLASS | BACKGROUND CLASS |
|---|---|---|---|---|
| Maximum bitrate | X | X | X | X |
| Delivery order | X | X | X | X |
| Maximum SDU size | X | X | X | X |
| SDU format information | X | X | | |
| SDU error ratio | X | X | X | X |
| Residual bit error ratio | X | X | X | X |
| Delivery of erroneous SDUs | X | X | X | |
| Transfer delay | X | X | | |
| Guaranteed bit rate | X | X | | |
| Traffic handling priority | | | X | |
| Allocation/Retention priority | X | X | X | X |
| Source statistics descriptor | X | X | | |
| Signalling indication | | | X | |
| Evolved Allocation/Retention priority | X | X | X | X |

RELATIONSHIP BETWEEN QoS CLASS AND ATTRIBUTE

FIG. 6

| QCI | RESOURCE TYPE | PRIORITY | PACKET DELAY BUDGET [ms] | PACKET ERROR LOSS RATE | EXAMPLE SERVICE |
|---|---|---|---|---|---|
| 1 | GBR | 2 | 100 | $10^{-2}$ | Conversational Voice |
| 2 | GBR | 4 | 150 | $10^{-3}$ | Conversational Video (Live Streaming) |
| 3 | GBR | 3 | 50 | $10^{-3}$ | Real Time Gaming |
| 4 | GBR | 5 | 300 | $10^{-6}$ | Non-Conversational Video (Buffered Streaming) |
| 65 | GBR | 0.7 | 75 | $10^{-2}$ | Mission Critical user plane Push To Talk voice (e.g., MCPTT) |
| 66 | GBR | 2 | 100 | $10^{-2}$ | Non-Mission-Critical user plane Push To Talk Voice |
| 5 | Non-GBR | 1 | 100 | $10^{-6}$ | IMS Signalling |
| 6 | Non-GBR | 6 | 300 | $10^{-6}$ | Video (Buffered Streaming) TCP-based (e.g., www, e-mail, chat, ftp, p2p file sharing, progressive video, etc.) |
| 7 | Non-GBR | 7 | 100 | $10^{-3}$ | Voice, Video (Live Streaming) Interactive Gaming |
| 8 | Non-GBR | 8 | 300 | $10^{-6}$ | Video (Buffered Streaming) TCP-based (e.g., www, e-mail, chat, ftp, p2p file sharing, progressive video, etc.) |
| 9 | Non-GBR | 9 | 300 | $10^{-6}$ | |
| 69 | Non-GBR | 0.5 | 60 | $10^{-6}$ | Mission Critical delay sensitive signalling (e.g., MCPTT signalling) |
| 70 | Non-GBR | 5.5 | 200 | $10^{-6}$ | Non-Mission-Critical Data (e.g., example services are the same as QCI 6/8/9) |

FIG. 7

| QCI | RESOURCE TYPE | PRIORITY | PACKET DELAY BUDGET [ms] | PACKET ERROR LOSS RATE | EXAMPLE SERVICE |
|---|---|---|---|---|---|
| 11 | GBR | 1 | 50 | $10^{-6}$ | Device Control |

FIG. 8

| QCI | RESOURCE TYPE | PRIORITY | PACKET DELAY BUDGET [ms] | PACKET ERROR LOSS RATE | EXAMPLE SERVICE |
|---|---|---|---|---|---|
| 11 | GBR | 0.3 | 50 | $10^{-6}$ | Device Control |
| 1 | GBR | 2 | 100 | $10^{-2}$ | Conversational Voice |
| 2 | GBR | 4 | 150 | $10^{-3}$ | Conversational Video (Live Streaming) |
| 3 | GBR | 3 | 50 | $10^{-3}$ | Real Time Gaming |
| 4 | GBR | 5 | 300 | $10^{-6}$ | Non-Conversational Video (Buffered Streaming) |
| 65 | GBR | 0.7 | 75 | $10^{-2}$ | Mission Critical user plane Push To Talk voice (e.g., MCPTT) |
| 66 | GBR | 2 | 100 | $10^{-2}$ | Non-Mission-Critical user plane Push To Talk Voice |
| 5 | Non-GBR | 1 | 100 | $10^{-6}$ | IMS Signalling |
| 6 | Non-GBR | 6 | 300 | $10^{-6}$ | Video (Buffered Streaming) TCP-based (e.g., www, e-mail, chat, ftp, p2p file sharing, progressive video, etc.) |
| 7 | Non-GBR | 7 | 100 | $10^{-3}$ | Voice, Video (Live Streaming) Interactive Gaming |
| 8 | Non-GBR | 8 | 300 | $10^{-6}$ | Video (Buffered Streaming) TCP-based (e.g., www, e-mail, chat, ftp, p2p file sharing, progressive video, etc.) |
| 9 | Non-GBR | 9 | 300 | $10^{-6}$ | Video (Buffered Streaming) TCP-based (e.g., www, e-mail, chat, ftp, p2p file sharing, progressive video, etc.) |
| 69 | Non-GBR | 0.5 | 60 | $10^{-6}$ | Mission Critical delay sensitive signalling (e.g., MCPTT signalling) |
| 70 | Non-GBR | 5.5 | 200 | $10^{-6}$ | Non-Mission-Critical Data (e.g., example services are the same as QCI 6/8/9) |

FIG. 14

| SUB CLASS | RESOURCE TYPE | PRIORITY | PACKET DELAY BUDGET [ms] | PACKET ERROR LOSS RATE |
|---|---|---|---|---|
| EMERGENCY | GBR | 1 | 25 | $10^{-6}$ |
| REAL TIME | GBR | 1 | 40 | $10^{-6}$ |
| MEDIUM | GBR | 1 | 50 | $10^{-6}$ |
| SLOW | GBR | 1 | 75 | $10^{-6}$ |

FIG. 15

| SUB CLASS | RESOURCE TYPE | PRIORITY | PACKET DELAY BUDGET [ms] | PACKET ERROR LOSS RATE |
|---|---|---|---|---|
| HIGH | GBR | 1 | 50 | $10^{-8}$ |
| MEDIUM | GBR | 1 | 50 | $10^{-6}$ |
| LOW | GBR | 1 | 50 | $10^{-4}$ |

FIG. 16

| SUB CLASS | RESOURCE TYPE | PRIORITY | PACKET DELAY BUDGET [ms] | PACKET ERROR LOSS RATE |
|---|---|---|---|---|
| EMERGENCY | 1.0 (GBR) | 1.0 | 0.5 | 1.0 |
| REAL TIME | 1.0 (GBR) | 1.0 | 0.75 | 1.0 |
| MEDIUM | 1.0 (GBR) | 1.0 | 1.0 | 1.0 |
| SLOW | 1.0 (GBR) | 1.0 | 1.25 | 1.0 |

FIG. 17

| SUB CLASS | RESOURCE TYPE | PRIORITY | PACKET DELAY BUDGET [ms] | PACKET ERROR LOSS RATE |
|---|---|---|---|---|
| HIGH | 1.0 (GBR) | 1.0 | 1.0 | 0.01 |
| MEDIUM | 1.0 (GBR) | 1.0 | 1.0 | 1.0 |
| LOW | 1.0 (GBR) | 1.0 | 1.0 | 100 |

FIG. 18

| SUB CLASS | RESOURCE TYPE | PRIORITY | PACKET DELAY BUDGET [ms] | PACKET ERROR LOSS RATE |
|---|---|---|---|---|
| EMERGENCY | - | - | 25 | - |
| REAL TIME | - | - | 40 | - |
| MEDIUM | - | - | 50 | - |
| SLOW | - | - | 75 | - |

FIG. 19

| SUB CLASS | RESOURCE TYPE | PRIORITY | PACKET DELAY BUDGET [ms] | PACKET ERROR LOSS RATE |
|---|---|---|---|---|
| HIGH | - | - | - | $10^{-8}$ |
| MEDIUM | - | - | - | $10^{-6}$ |
| LOW | - | - | - | $10^{-4}$ |

FIG. 20

| SUB CLASS | RESOURCE TYPE | PRIORITY | PACKET DELAY BUDGET [ms] | PACKET ERROR LOSS RATE |
|---|---|---|---|---|
| EMERGENCY | - | - | 0.5 | - |
| REAL TIME | - | - | 0.75 | - |
| MEDIUM | - | - | 1.0 | - |
| SLOW | - | - | 1.25 | - |

FIG. 21

| SUB CLASS | RESOURCE TYPE | PRIORITY | PACKET DELAY BUDGET [ms] | PACKET ERROR LOSS RATE |
|---|---|---|---|---|
| HIGH | - | - | - | 0.01 |
| MEDIUM | - | - | - | 1.0 |
| LOW | - | - | - | 100 |

BASE STATION, CONTROL APPARATUS, WIRELESS TERMINAL, AND WIRELESS COMMUNICATION SYSTEM

CROSS-REFERENCE TO RELATED APPLICATION

This application is a continuation of U.S. application Ser. No. 16/189,401, filed on Nov. 13, 2018, which is a continuation application of International Application PCT/JP2016/064784 filed on May 18, 2016 and designated the U.S., the entire contents of each are incorporated herein by reference.

FIELD

The present invention relates to a base station, a control apparatus, a wireless terminal, and a wireless communication system.

BACKGROUND

As an example of a wireless communication system, at present, Long Term Evolution (LTE) or LTE-Advanced (LTE-A) of which specifications are formulated in 3rd Generation Partnership Project (3GPP) is provided.

In the wireless communication system, such as LTE or LTE-A, in some cases, a service class for transferring a signal is specified on a per-service basis, and a transfer of a signal is controlled using the service class. Information relating to signal transfer quality, for example, a signal transfer delay, a transfer error rate, or a guaranteed transfer speed, or any combination thereof, may be included in the service class.

Examples of the related art include Japanese National Publication of International Patent Application No. 2015-510377, International Publication Pamphlet No. 2014/207930, Japanese Laid-open Patent Publication No. 2012-119810, NPL1[3GPP TS23.203, V13.7.0, March 2016], NPL2[3GPP TS23.107, V13.0.0, December 2015], NPL3 [3GPP TS36.321, V13.0.0, December 2015], NPL4 [NISIDA et al., "Basic SAE Management Technology for Realizing All-IP Network", NTT docomo Technical Journal, Vol. 17, No. 3, pp 6-14, [online], [search on Mar. 22, 2016], the Internet <URL:https://www.nttdocomo.co.jp/binary/pdf/corporate/technology/rd/technical_journal/bn/vol17_3/vol17_3_006jp.pdf>], NPL5[TANAKA et al., "Overview of GSMA VoLTE Profile", NTT docomo Technical Journal, Vol. 19, No. 4, pp 45-50, [online], [search on Mar. 22, 2016], the Internet <URL: https://www.nttdocomo.co.jp/binary/pdf/corporate/technology/rd/technical_journal/bn/vol19_4/vol19_4_045jp.pdf>].

SUMMARY

According to an aspect of the invention, a base station includes: a transmitter configured to transmit an operation signal for a remote control; and a controller that is coupled to the transmitter, wherein the controller is configured to execute a setting process that includes setting, with regard to transmission of the operation signal, a service class for the remote control, and execute a control process that includes controlling, in accordance with the service class, the operation signal to be transmitted via the transmitter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a relationship between a Quality of Service (QoS) class and an attribute.

FIG. 6 is a diagram illustrating an example of QoS Class Indicator (QCI) characteristics.

FIG. 7 is a diagram illustrating an example of setting a service class that is newly added, which is QCI-based.

FIG. 8 is a diagram illustrating an example of QCI attributes, in which the service class that is newly added is included.

FIG. 14 is a diagram illustrating an example of a value that is set to be in a subclass.

FIG. 15 is a diagram illustrating another example of the value that is set to be in the subclass.

FIG. 16 is a diagram illustrating an example of a coefficient that is set to be in a subclass.

FIG. 17 is a diagram illustrating another example of the coefficient that is set to be in the subclass.

FIG. 18 is a diagram illustrating an example in which values are not set for some attributes when compared with FIG. 14.

FIG. 19 is a diagram illustrating an example in which values are not set for some attributes when compared with FIG. 15.

FIG. 20 is a diagram illustrating an example in which values are not set for some attributes when compared with FIG. 16.

FIG. 21 is a diagram illustrating an example in which values are not set for some attributes when compared with FIG. 17.

DESCRIPTION OF EMBODIMENTS

Figure 1:
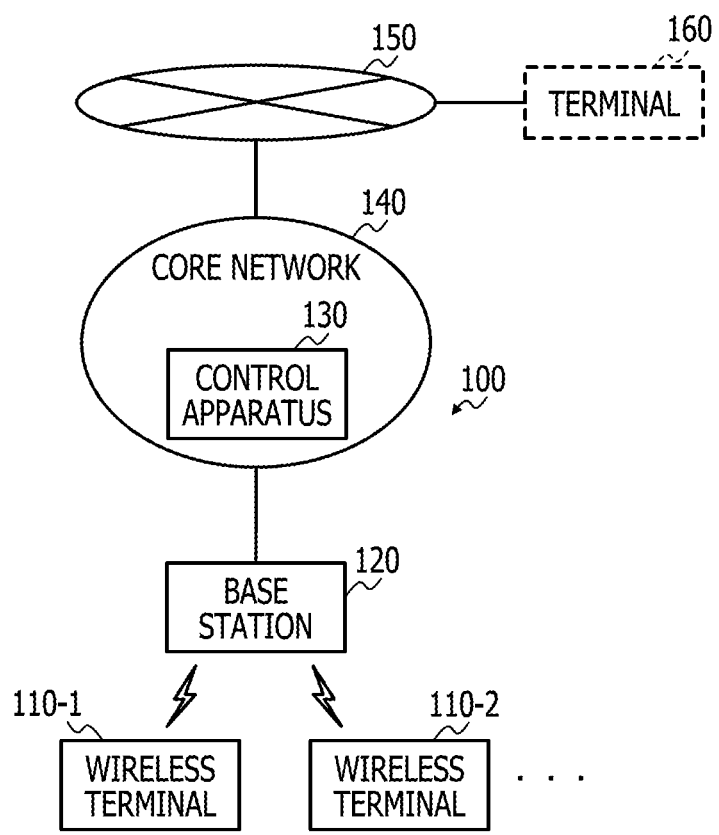
FIG. 1 is a block diagram illustrating an example of a configuration of a wireless communication system according to a first embodiment.

In the wireless communication system, such as LTE or LTE-A, in some cases, it is desired that an operation signal (which is operation data or an operation signal, and which is hereinafter collectively as an "operation signal) for operating a device, for example, is transferred with higher transfer quality than in an existing service class.

According to an aspect of the present invention, an object of the invention is to improve transfer quality of an operation signal.

It is noted that no limitation to the object is imposed and that another object of the present invention is also to accomplish the operation and effect which are inherent in each configuration which is detailed in embodiments of the invention which will be described below, with the operation and effect being not accomplished in the related art.

Embodiments of the present invention will be described below with reference to the drawings. However, the embodiments that will be described below are given as only examples, and this is not intended to exclude various modifications or applications of the technology that will not be specified below. For example, various modifications to the present embodiment may be made, for implementation, in the scope that does not depart from the nature and gist thereof.

It is noted that, in the drawings that are referred to when the embodiments are described below, are portions that are given the same reference numeral are the same or similar, except as otherwise specified. Furthermore, in a case where a plurality of apparatuses are not distinguished from each other in the following description, in some cases, a reference numeral that is made up of two numerals with a hyphen in between is expressed in a manner that omits the numeral which follows the hyphen. As an example, in a case where wireless terminals 110-1 and 110-2 that are illustrated in FIG. 1 are not distinguished from each other, in some cases, the wireless terminals 110-1 and 110-2 are simply expressed as a wireless terminal 110.

[1] First Embodiment

FIG. 1 is a block diagram illustrating an example of a configuration of a wireless communication system 100 according to a first embodiment. As illustrated in FIG. 1, the wireless communication system 100 according to the first embodiment may include a plurality of wireless terminals (two wireless terminals in an example in FIG. 1), wireless terminals 110-1 and 110-2, a base station 120, and a control apparatus 130, in an exemplary manner. It is noted that three or more wireless terminals 110 may be present in the wireless communication system 100.

Each of the wireless terminals 110-1 and 110-2 performs wireless communication with the base station 120, and thus possibly performs communication between a core network 140 including the control apparatus 130 and a network 150 through the base station 120. Furthermore, the wireless terminals 110-1 and 110-2 possibly perform communication with each other through the base station 120 and the control apparatus 130. It is noted that a terminal 160 may be connected to the network 150.

Figure 2:
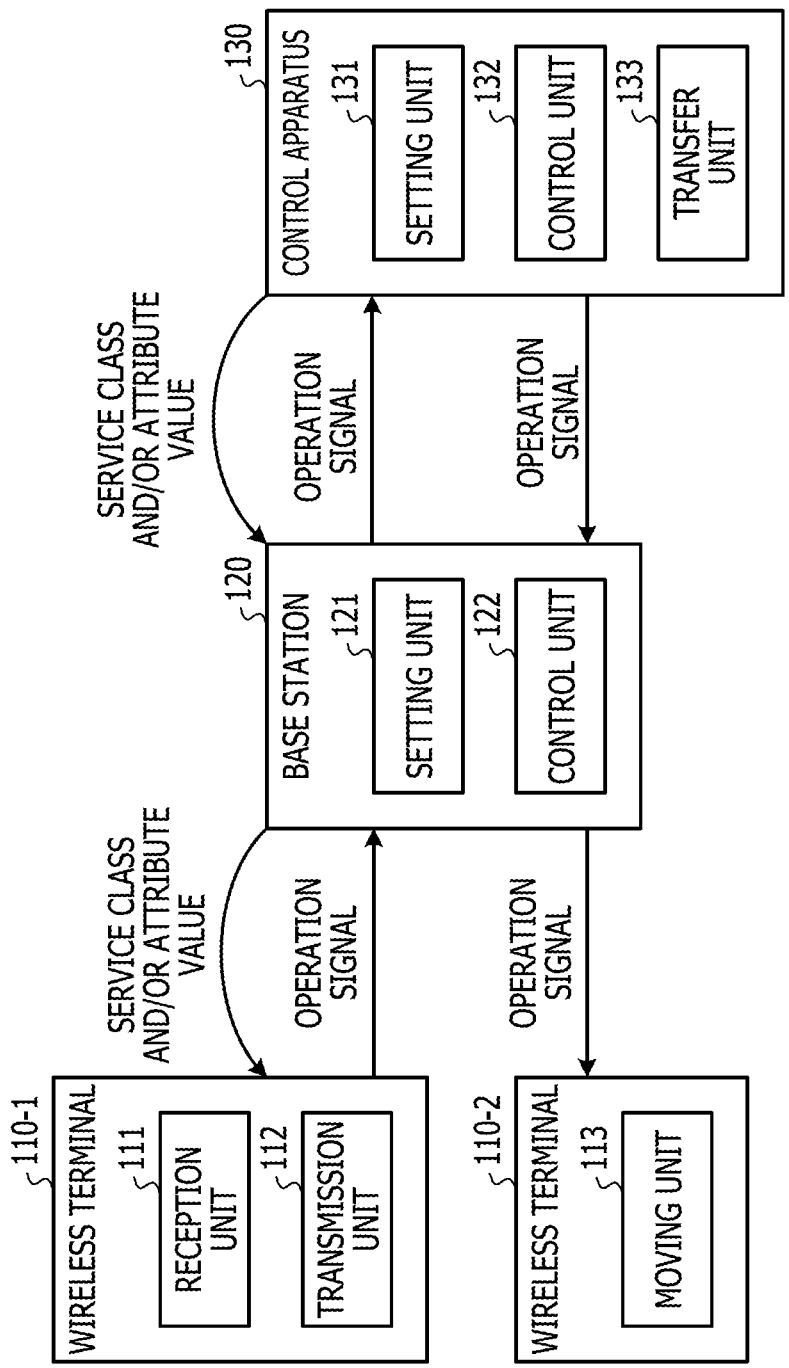
FIG. 2 is a diagram for describing an example of operation of the wireless communication system that is illustrated in FIG. 1.

The wireless terminal 110-1, as illustrated in FIG. 2, includes a reception unit 111 and a transmission unit 112. The wireless terminal 110-1 may transmit a signal, for example, an operation signal for operating the wireless terminal 110-2, to the wireless terminal 110-2 through the base station 120 and the control apparatus 130.

The wireless terminal 110-2 is an example of a wireless device that has a wireless function. It is noted that, in some cases, the wireless device is referred to simply as a device. The device may have a built-in wireless function, and a wireless device may be attached to the device from the outside. The device may be equipped with a moving unit (or an operating unit) (the "moving unit" is hereinafter used as a generic term) that is operated with the operation signal. The moving unit may be built into the device, and may be included in an apparatus to which the wireless device is attached. In the following description, the wireless terminal 110-2 is set to be a device that has a built-in wireless function and a built-in moving unit 113 (refer to FIG. 2).

The base station 120, as illustrated in FIG. 2, includes a setting unit 121 and a control unit 122. Furthermore, the control apparatus 130, as illustrated in FIG. 2, includes a setting unit 131, a control unit 132, and a transfer unit 133.

As illustrated in FIG. 2, the operation signal that is to be transmitted from the wireless terminal 110-1 is transferred along a path that involves the base station 120, the control apparatus 130, and the base station 120. The operation signal is received in the wireless terminal 110-2, and is used for operation of the wireless terminal 110-2.

It is noted that the wireless communication system 100 may support as a communication between the wireless terminals 110 a communication that involves the base station 120 (which is hereinafter expressed as a "return communication") instead of involving the core network 140, or a proximity communication service between the wireless terminals 110. In a case where the return communication or the proximity communication service is used in the wireless communication system 100, the operation signal may be transmitted from the wireless terminal 110-1, via the base station 120, and may be received in the wireless terminal 110-2.

Figure 3:
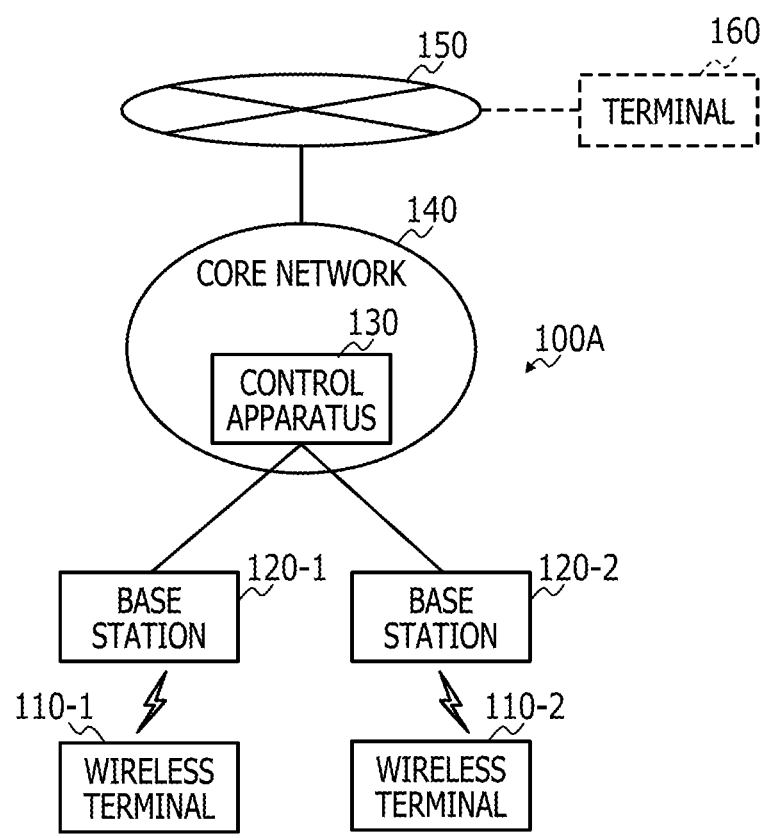
FIG. 3 is a block diagram illustrating another example of the configuration of the wireless communication system according to the first embodiment.

Furthermore, the wireless terminal 110-2 may perform wireless communication with any other base station that is different from the base station 120. FIG. 3 is a block diagram illustrating an example of a configuration of a wireless communication system 100A according to a first embodiment. As illustrated in FIG. 3, the wireless communication system 100A may include a plurality of base stations (two base stations in an example in FIG. 3), base stations 120-1 and 120-2. It is noted that three or more base stations 120 may be present in the wireless communication system 100A.

In an example that is illustrated in FIG. 3, the wireless terminal 110-1 performs wireless communication with the base station 120-1, and the wireless terminal 110-2 performs wireless communication with the base station 120-2. Each of the base stations 120-1 and 120-2 may employ the same configuration as the base station 120 in FIG. 1, and may be connected to the control apparatus 130.

Figure 4:
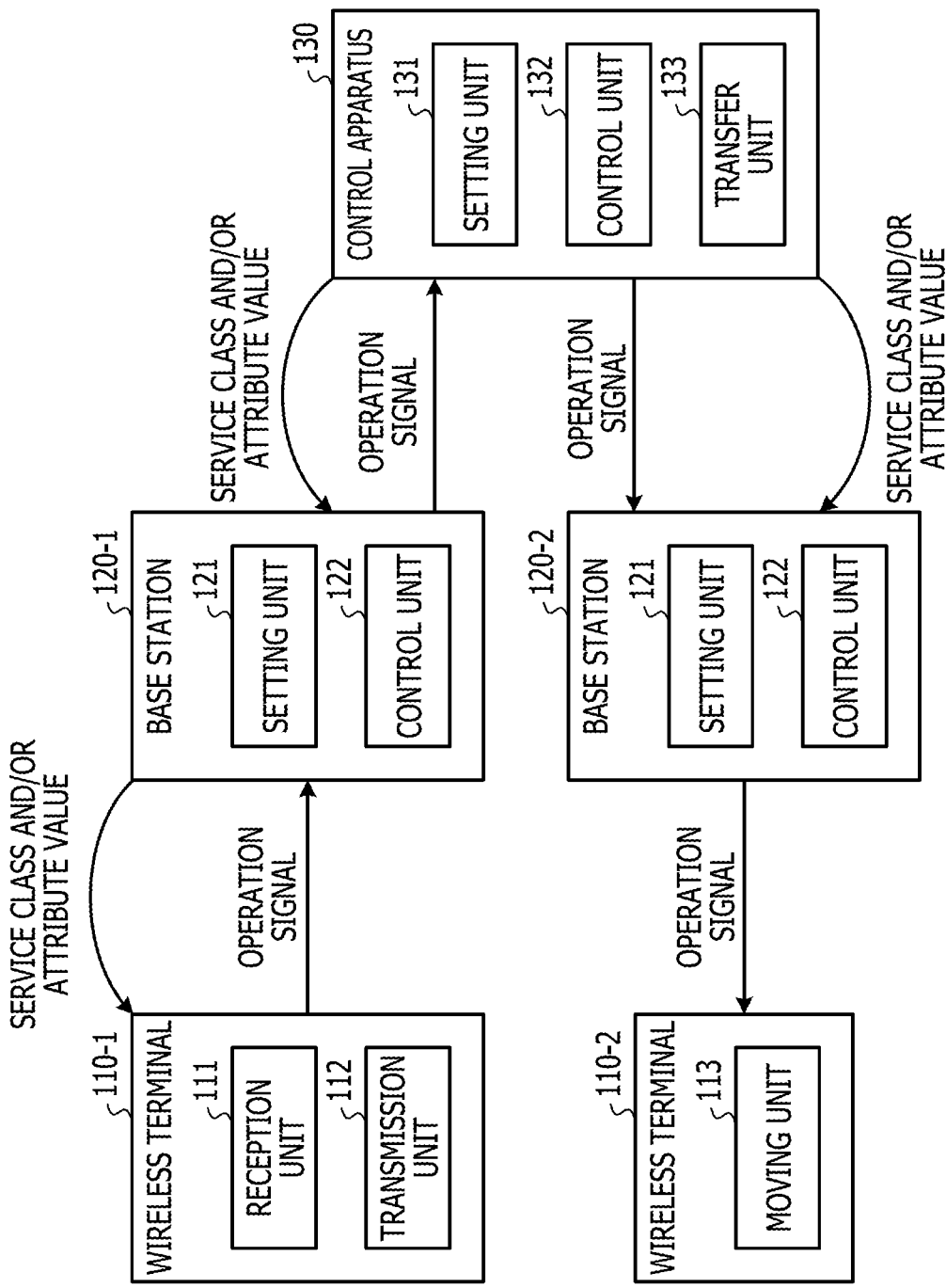
FIG. 4 is a diagram for describing an example of operation of the wireless communication system that is illustrated in FIG. 3.

As illustrated in FIG. 4, the operation signal that is to be transmitted from the wireless terminal 110-1 is transferred along a path that involves the base station 120-1, the control apparatus 130, and the base station 120-2. The operation signal is received in the wireless terminal 110-2, and is used for operation of the wireless terminal 110-2.

At this point, the operation of each of the wireless communication systems 100 and 100A according to the first embodiment is possible according to at least one of the following first implementation mode and second implementation mode.

[1-1] First Implementation Mode

As the first implementation mode of the first embodiment, the transfer unit 133 of the control apparatus 130 transfers information relating to a service class relating to the transfer of the operation signal to the base station 120. The setting unit 131 sets the service class relating to the transfer of the operation signal. The control unit 132 controls the transfer of the operation signal using the service class that is set.

The setting unit 121 of the base station 120 sets the service class relating to the transfer of the operation signal for operating the wireless terminal 110-2. The control unit 122 controls the transfer of the operation signal using the service class that is set. The service classes that are set for the base station 120 and the control apparatus 130 may be the same. It is noted that the base station 120 may have a transmission unit that transmits information relating to the service class, which is received from the control apparatus 130, to the wireless terminal 110-1.

The reception unit 111 of the wireless terminal 110-1 may receive the information relating to the service class to the base station 120. The transmission unit 112 transmits the operation signal to the base station 120, using the service class relating to the transfer of the operation signal for operating the wireless terminal 110-2.

In an example that is illustrated in FIG. 2, the transfer of the operation signal that is to be transmitted from the wireless terminal 110-1 is controlled in each of the base station 120 and the control apparatus 130, using the service class relating to the transfer of the operation signal.

Furthermore, in an example that is illustrated in FIG. 4, the transfer of the operation signal that is to be transmitted from the wireless terminal 110-1 is controlled in each of the base station 120-1, the control apparatus 130, and the base station 120-2, using the service class relating to the transfer of the operation signal.

As described above, in the wireless communication systems 100 and 100A according to the first implementation mode, the service class relating to the transfer of the operation signal for operating the wireless terminal 110-2 is set by the base station 120 and the control apparatus 130. Then, the transfer of the operation signal is controlled using the service class that is set.

At this point, regarding the service class relating to the transfer of the operation signal, information relating to signal transfer quality, for example, a combination of values of attributes of two or more of a signal transfer delay, a transfer error rate, and a guaranteed transfer speed may be a combination of values that is not present in an existing service class. Alternatively, regarding the service class relating to the transfer of the operation signal, a value of an attribute of at least one of these may be a value that is not present in the existing service class. It is noted that the value that is not present in the existing service class, for example, may be a value for good quality.

In this manner, in a case where a service class that has higher transfer quality than the existing service class is used, the wireless communication systems 100 and 100A may improve operation signal transfer quality.

For example, a case is considered where the wireless terminal 110-2 is a vehicle of which automatic driving is, a robot that operates by remote control, an apparatus, or the like and where the moving unit 113 of the vehicle, the robot, the apparatus, or the like is operated with the operation signal. In such a case, with the wireless communication system 100 and 100A, because the operation signal transfer quality may be improved, the quick response and the precision (accuracy) of the operation of the wireless terminal 110-1, which is caused by the wireless terminal 110-2, may be improved.

[1-2] Second Implementation Mode

As the second implementation mode of the first embodiment, the transfer unit 133 of the control apparatus 130 transfers information relating to a service class relating to the transfer of the signal and/or information relating to an attribute value that is different from a value of at least one attribute which is set to be in a service class, to the base station 120. The setting unit 121 of the base station 120 sets a service class relating to the transfer of the signal. Furthermore, the setting unit 131 of the control apparatus 130 sets the service class relating to the transfer of the signal.

It is noted that the service classes that are set for the base station 120 and the control apparatus 130 may be the same. A service class according to the second implementation mode may be different from the service class relating to the transfer of the operation signal for operating the wireless terminal 110-2 according to the first implementation mode.

The transmission unit 112 of the wireless terminal 110-1 adds the information relating to the attribute value that is different from a value of at least one attribute that is set to be in a service class relating to the transfer of the signal, to the operation signal for operating the wireless terminal 110-2, and transmits the operation signal to which the information is added, to the base station 120. It is noted that the information relating to the attribute value may be information that is transmitted from the base station 120 and is received in the reception unit 111.

The control unit 122 of the base station 120 controls the transfer of the operation signal, using the service class that is set, and the information that is associated with the operation signal. Furthermore, the setting unit 131 of the control apparatus 130 controls the transfer of the operation signal, using the service class that is set, and the information that is associated with the operation signal.

In the example that is illustrated in FIG. 2, the transfer of the operation signal that is to be transmitted from the wireless terminal 110-1 is controlled in each of the base station 120 and the control apparatus 130, using the service class relating to the transfer of the signal and the information that is added to the operation signal.

Furthermore, in the example that is illustrated in FIG. 4, the transfer of the operation signal that is to be transmitted from the wireless terminal 110-1 is controlled in each of the base station 120-1, the control apparatus 130, and the base station 120-2, using the service class relating to the transfer of the signal and the information that is added to the operation signal.

As described, the wireless communication systems 100 and 100A according to the second implementation mode, the transfer of the operation signal is controlled by the base station 120 and the control apparatus 130, using the service class relating to the transfer of the signal and the information that is associated with the operation signal.

At this point, an attribute of a transfer delay relating to the transfer of the signal, a transfer error rate, or guaranteed transfer speed, or any combination thereof may be set to be in the service class relating to the transfer of the signal, and the information relating to the attribute value that is different from a value of at least one attribute of these may be added to the operation signal.

Accordingly, each of the base station 120 and the control apparatus 130, for example, may change a value of an attribute that is set to be in a service class using information relating to the attribute value that is associated with the operation signal.

In this manner, it is possible that the wireless communication systems 100 and 100A causes the value of at least one attribute that is set to be in an existing service class or the service class according to the first implementation mode to change, for example, to a value (for example, a value for good quality) that is suitable for the transfer of the operation signal.

Therefore, according to the second implementation mode, the signal transfer quality may also be improved. Furthermore, for example, in a case where the wireless terminal 110-2 is a vehicle of which automatic driving is possible, a robot that operates by remote control, or the like, the quick response or the like of the operation of the wireless terminal 110-2, which is caused by the wireless terminal 110-1, may be improved.

Moreover, the information relating to the attribute value that is added to the operation signal may differ from one operation signal to another, or the information relating to the attribute value may not be added. Therefore, although an allowable condition for transfer quality differs from one operation signal to another, and so forth, the transfer quality in accordance with the operation signal may be provided.

It is noted that, according to at least one of the first implementation mode and the second implementation mode, the control apparatus 130 may possibly communicate with the terminal 160 (refer to FIGS. 1 and 3) through the network 150 that is connected to the core network 140. In a case where the network 150 supports a service class that is at least partly the same as the service class relating to the transfer of the operation signal, the terminal 160 may be regarded as an example of the device.

In this case, at least one of the core network 140 and the network 150, the service class that is at least partly the same as the service class relating to the transfer of the operation signal may be set, and the transfer of the operation signal destined for the terminal 160 may be controlled using the service class.

[2] Second Embodiment

In the wireless communication system, in some cases, the transfer of the signal is controlled using Quality of Service (QoS).

QoS Class and QoS Attribute are specified in 3GPP TS23. 107, V13.0.0. QoS may be categorized by a type of traffic into four QoS classes, "Conversational class", "Streaming class", "Interactive class", and "Background class".

Examples of an attribute of QoS class may include "Maximum bitrate [kbps]", "Guaranteed bit rate [kbps]", "Delivery order [y/n]", "Maximum SDU size [octets]", "SDU format information [bits]", and "SDU error ratio". Furthermore, the examples of the attribute of the QoS class may include "Residual bit error rate," "Delivery of erroneous SDUs [y/n/-]", "Transfer delay [ms]", "Traffic handling priority", and "Allocation/Retention Priority". Moreover, the examples of the attribute of the QoS class may include "Source statistics descriptor ['speech'/'unknown'", "Signalling Indication [Yes/No]", and "Evolved Allocation/Retention Priority". It is noted that "Delivery order [y/n]" is information indicating whether or not a unit for transferring a bearer is a Service Data Unit (SDU).

FIG. 5 is a diagram illustrating an example of a relationship between the QoS class and the attribute. As illustrated in FIG. 5, an attribute of a combination in accordance with the QoS class may be set for the QoS class.

FIG. 6 is a diagram illustrating an example of QCI characteristics. QCI is abbreviation of QoS Class Indicator, and is an example of a parameter for allocating traffic to a suitable QoS. The QCI characteristics that are illustrated in FIG. 6 are specified in 3GPP TS23.203, V13.7.0.

As illustrated in FIG. 6, as the QCI characteristics, "QCI", "Resource Type", "Priority", "Packet Delay Budget [ms]", "Packet Error Loss Rate", and "Examples Service" may be specified.

"QCI" is an identifier of the QoS class. "Resource Type" indicates the presence or absence of speed guarantee, and a Guaranteed Bit Rate (GBR) (speed guarantee enabled) or a Non-GBR (speed guarantee disabled) is set to be in the field "Resource Type". "Priority" denotes priority of QoS, and "Packet Delay Budget [ms]" indicates a maximum value (ms) of a packet transfer delay. "Packet Error Loss Rate" indicates a ratio of packets that are lost when a network is not congested, and "Examples Service" indicates a service that is used for the QoS class.

It is noted that, in FIG. 6, a class of which a QCI characteristic is "QCI": "65", "66", "69", or "70" is for "Mission Critical communication". This, for example, is used for communication or the like when Earthquake Early Warning or a natural disaster happens. As Earthquake Early Warning, for example, Earthquake and Tsunami Warning System (ETWS), Public Safety System (PSC), or the like is given in 3GPP.

As described above, in the wireless communication system, with the QoS class or QCI, the signal transfer quality may be managed on a per-service or bearer basis. In other words, in some cases, the QoS class or QCI is an example of a service class for transferring a signal. In some cases, "QoS class" is hereinafter referred to as a term that means both QoS and QCI. "QoS class" may be referred to as a "transfer condition".

Furthermore, "Transfer delay [ms]" that is an attribute of the QoS class or "Packet Delay Budget [ms]" that is a QCI characteristic is an example of a parameter relating to the signal transfer delay.

Moreover, "SDU error ratio" that is an attribute of the QoS class or "Packet Error Loss Rate" that is a QCI characteristic is an example of a parameter relating to the transfer error rate.

Furthermore, "Guaranteed bit rate [kbps]" that is an attribute of the QoS class, or "Resource Type" (GBR or Non-GBR) that is a QCI characteristic is an example of a parameter relating to the guaranteed transfer speed.

It is noted that information relating to a bit rate, such as "Maximum bitrate [kbps]", that is an attribute of the QoS class, may be included in the parameter relating to the signal transfer delay, or the parameter relating to the guaranteed transfer speed. Furthermore, information relating to priority, such as "Traffic handling priority" that is an attribute of the QoS class, or "Priority" that is a QCI characteristic, may be included in the parameter relating to the signal transfer delay, or the parameter relating to the guaranteed transfer speed.

At this point, in 3GPP, a study has been conducted on the support of Internet of Things (IoT) in which access to various devices is possible through the Internet, or Machine to Machine (M2M) in which mutual communication between devices is possible, or the like, among 5G wireless communication schemes.

In the IoT or the M2M, it is also assumed that a device is operated (for example, is remotely operated) from a terminal. A case where the wireless communication system transfers the operation signal for operating the device, which is transmitted from a wireless terminal, is considered below.

As examples of the device, various devices, such as a vehicle and a robot, that are remotely operable are given. The device, for example, may have the moving unit that is operated with the operation signal. As examples of the moving unit, a driving mechanism, a robot arm, and the like are given. The driving mechanisms may include a power mechanism of a power source, such as an engine or a motor, and a moving mechanism, such as a steering gear or a brake. The robot arm may include a mechanism for power control of or moving of a manipulator.

It is noted that the device is a device (examples of which include an Integrated Circuit (IC) chip), such as a sensor, which has a wireless communication function, and may be attached to a vehicle, a robot, or the like. In a case where the device is a device such as a sensor, a vehicle, a robot, or the like that includes the device may be positioned with respect to the device.

Each of the wireless terminal and the device, for example, performs wireless communication with the base station, and thus possibly communicates with each other through the base station (or via a higher-layer control apparatus in the base station). It is noted that configurations of, and connection relationships among, the wireless terminal, the device, the base station, and the control apparatus, for example, may be the same as those, respectively, in the wireless communication systems 100 or 100A (refer to FIG. 1 or 3) according to the first embodiment.

Incidentally, in a case where the moving unit of the device is operated with the operation signal, a quantity of operation signals that are transferred at a time may be comparatively small. Furthermore, regarding the operation signal for which the quick response is desirable, not only is the guarantee of the transfer speed desirable, but a short transfer delay (ideally, a zero transfer delay) is also desirable. Moreover, in order to avoid unexpected operation of the device, for example, a transfer error of less than $10^{-6}$ (ideally, error-free) in the operation signal is desired.

Furthermore, it is considered that error correction is enabled (this may be indispensable). It is noted that, in a case where the error correction is enabled, in some cases, a transfer quantity is three times as large. Because of the enabling or disabling of the error correction is not included in the transfer condition, for example, an attribute of QoS, the enabling or disabling of the error correction may be excluded from consideration.

In a case where, as described above, the moving unit of the device is operated with the operation signal, the operation signal may be transferred in the transfer condition for satisfying the following transfer quality.

Transfer Quantity: Small
Transfer Delay: Short (ideally, 0)
Transfer Error: less than or equal to $10^{-6}$ (ideally, error-free)
Error Correction: Enabled However, the QoS class that satisfies the above-described transfer quality is not present in a current QoS. For example, in FIG. 6, a service class of which QCI characteristics are "Resource Type": "GBR", "Packet Delay Budget [ms]": "50", and "QCI": "3" has the shortest transfer delay in the GBR. However, because "Packet Error Loss Rate": "$10^{-3}$", a service class of which a QCI characteristic is "QCI": "3" does not satisfy the above-described transfer quality in terms of the transfer error.

On the other hand, a service class of which QCI characteristics are "Resource Type": "GBR", "Packet Error Loss Rate": "$10^{-6}$", and "QCI": "4" has the smallest transfer error in the GBR. However, because "Packet Delay Budget [ms]": "300", regarding the transfer delay, a service class of which a QCI characteristic is "QCI": "4" does not satisfy the above-described transfer quality.

So, in the second embodiment, the QoS class for transferring the operation signal for operating the device is newly added to an existing QoS class. The QoS class that is newly added is hereinafter referred to, in an exemplary manner, as "Device control class".

"Device control class" may be different from a QoS class dedicated for Machine Type Communication (MTC) in the related art in LTE or LTE-A, for example, in terms of the quick response. This is because MTC does not assume the quick response, that is, that a signal is transferred the quick response. It is noted that, like Ultra Reliability Low Latency Communication (URLLC) in the 5G mobile communication (NR next radio), "Device control class" may include a service that has a low transfer error rate and a small transfer delay.

It is noted that, in the same manner as the existing QoS class, "Device control class" may be set at the time of service setup or communication-channel setup.

FIG. 7 illustrates a setting example of "Device control class" that is QCI-based. As illustrated in FIG. 7, "Resource Type": "GBR", "Packet Delay Budget [ms]": "50", "Packet Error Loss Rate: $10^{-6}$", and "Examples Service": "Device Control" may be set for "Device control class".

It is noted that "Packet Delay Budget [ms]" is not limited "50", and, for example, may be smaller than "50" (for example, "5" or the like). Furthermore, "Packet Error Loss Rate" is not limited to "$10^{-6}$", and, for example, may be smaller than "10–6" (for example, "10–9" or the like). "GBR" may be set to be in "Resource Type" from the point of view of speed guarantee".

Furthermore, "QCI": "11" and "Priority": "1" may be set for "Device control class". "QCI" and "Priority" may be set in a relationship with respect to any other QoS class (for example, in such a manner as not to overlap any other QoS class), and are not limited to "11" and "1", respectively.

FIG. 8 is a diagram illustrating an example of the QCI characteristics, in which "Device control class" is included. As illustrated in FIG. 8, in a case where "Device control class" is expressed along with the existing QoS class, a higher priority than in the existing QoS class, for example, "0.3", may be set to be in "Priority". It is noted that, "QCI" or "Priority" in any other QoS class, which accompanies the addition of "Device control class" may be changed.

As described above, new "Device control class" for transferring the operation signal is set for each entity in the wireless communication system, for example, the base station or the control apparatus, and thus, the operation signal is possibly transferred with "Device control class".

Therefore, the operation signal may be transferred at a high speed. Furthermore, the operation signal transfer quality may be improved. Accordingly, the quick response of the operation of the device, which is caused by the wireless terminal, may be improved, and/or a transfer error may be reduced.

In a case where the device is remotely controlled while being viewed, for example, such as in the case of robot arm control or remotely-controlled surgical operation, the application of "Device control class" described above is more effective. It is noted that, in a case where the remote control is performed while viewing an image, for example, when the operation signal is transferred at a high speed as a result of a reduction in maximum allowable delay, a moving image, a value of measurement by the sensor, or the like, which provides the basis for the operation of the device, may be transferred at a high speed during a fixed duration before and after the transfer of the operation signal.

As an example, the moving image or the value of the measurement by the sensor, which is captured or measured, respectively, on the device side, may be transferred with "Device control class" or any other service class from the device to the wireless terminal. It is noted that a signal which is to be transferred from the device to the wireless terminal is a signal relating to the operation of the device, and, because of this, may be referred to as the "operation signal" in the same manner as the signal for operating the device, which is to be transferred from the wireless terminal to the device.

[2-1] Example of a Configuration of the Wireless Communication System

Figure 9:
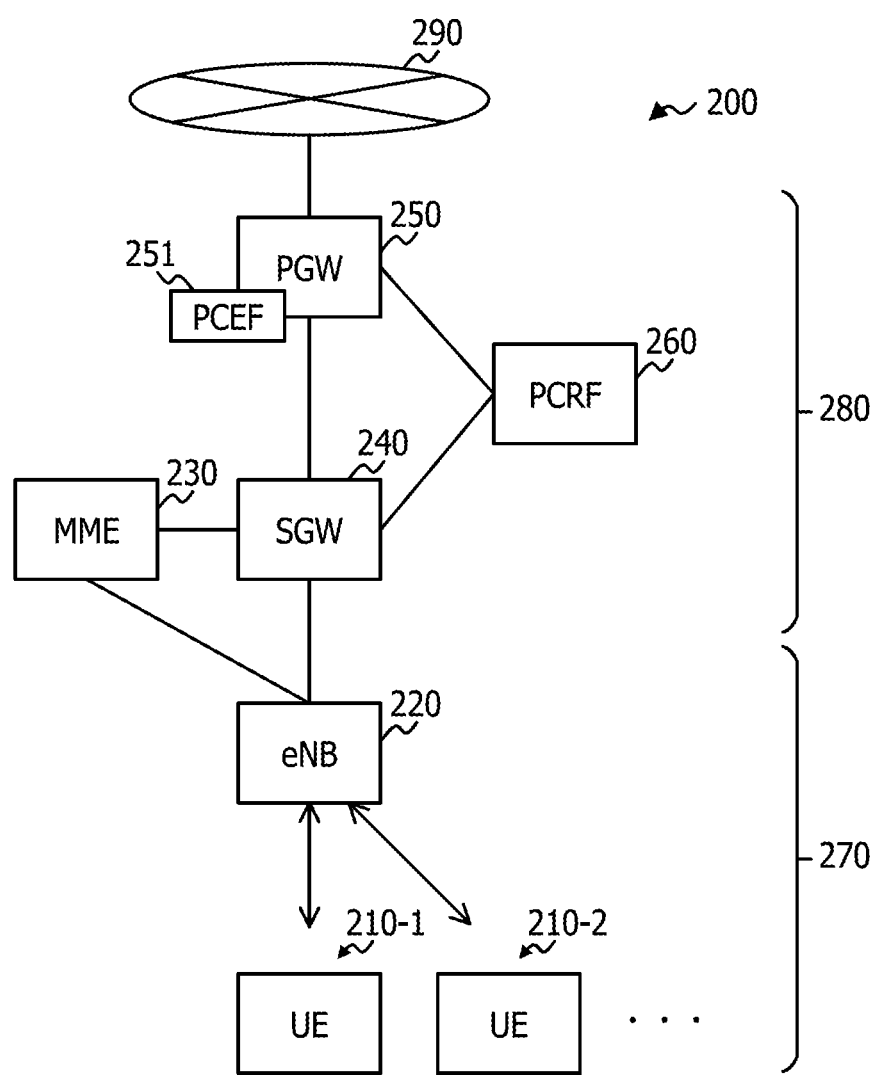
FIG. 9 is a block diagram illustrating an example of a wireless communication system according to a second embodiment.

An example of a wireless communication system according to a second embodiment will be described below. FIG. 9 is a block diagram illustrating an example of a wireless communication system 200 according to the second embodiment.

As illustrated in FIG. 9, the wireless communication system 200 may include a plurality of UEs (two UEs in an example in FIG. 7), UE 210-1 and 210-2, an eNB 220, an MME 230, an SGW 240, a PGW 250, and a PCRF 260, in an exemplary manner. "UE" is abbreviation of User Equipment, "eNB" is abbreviation of Evolved Node B, and "MME" is abbreviation of Mobility Management Entity. Furthermore, "SGW" is abbreviation of Serving Gateway", "PGW" is abbreviation of Packet Data Network (PDN) Gateway, and "PCRF" is abbreviation of Policy and Charging Rules Function.

It is noted that three or more UEs 210 may be present in the wireless communication system 200, that two or more eNBs 220 may be present in the wireless communication system 200, and that two or more MMEs 230 may be present in the wireless communication system 200. Furthermore, two or more SGWs 240 may be present in the wireless communication system 200, two or more PGWs 250 may be present in the wireless communication system 200, and two or more PCRFs 260 may be present in the wireless communication system 200.

The wireless communication system 200 performs wireless communication between the eNB 220 and the UE 210, which complies with a wireless communication scheme that is determined in advance. For example, the wireless communication scheme may be a 5G or later wireless communication scheme, and may be an existing wireless communication scheme, such as LTE, LTE-A, or Worldwide Interoperability for Microwave Access (WiMAX).

The UE 210 and the eNB 220 may be provided on the wireless access network 270 over which wireless communication is performed. The wireless access network 270, for example, may be a wireless area that is provided by one or more eNBs 220. It is noted that the wireless area may be formed according to a range (which may be referred to as "coverage") where a radio wave that is transmitted by the eNB 220 possibly propagates. Furthermore, the wireless area that is formed by the eNB 220 may be referred to as a cell or a sector. It is noted that the range where the radio wave possibly propagates may be a range where wireless communication-channel quality at or above a fixed level may be maintained, may be a range where an error rate is at or below a fixed value, and, as an example, may be a range where communication is possible.

The MME 230, the SGW 240, the PGW 250, and the PCRF 260 may form a packet core network 280 over which packet communication is performed.

The packet core network 280 is a communication network on which the eNB 220 is provided, and for example, is positioned with respect to a communication network that is at a higher layer than the eNB 220. It is noted that as an example of the packet core network 280, an Evolved Packet Core (EPC) is given.

The UE 210 is an example of the wireless terminal. As an example of the wireless terminal, a mobile station or a user terminal that has the wireless communication function is given such as a portable telephone such as a smartphone, a movable Personal Computer (PC) such as a laptop computer, and a data communication apparatus such as a mobile router. It is noted that the mobile station may move, for example, in a state of being attached to a vehicle or the like. Furthermore, in addition to these mobile stations or user terminals, the UE 210 may be an apparatus (examples of which include an IC chip) such as a sensor that has the wireless communication function.

The UE 210-2 is an example of the wireless device that, for example, has the wireless function. It is noted that, in some cases, the wireless device is referred to simply as the device. The device may have a built-in wireless function, and a wireless device may be attached to the device from the outside. As examples of the device, various devices, such as a vehicle and a robot, that are remotely operable are given. The device, for example, may have the moving unit that is operated with the operation signal. As examples of the moving unit, a driving mechanism, a robot arm, and the like are given.

It is noted that the UE 210-2 is a device (examples of which include an IC chip), such as a sensor, which has a wireless communication function, and may be attached to a vehicle, a robot, or the like. In a case where the UE 210-2 is a device such as a sensor, a vehicle, a robot, or the like that includes the UE 210-2 may be positioned with respect to the device. Furthermore, the moving unit may be built into the device, and may be included in a device to which the wireless device is attached. In the following description, the UE 210-2 is set to be a device that has a built-in wireless function and a built-in moving unit.

Each of the UEs 210-1 and 210-2 performs wireless communication with the eNB 220, and thus possibly performs communication between the packet core network 280 and a network 290 through the eNB 220. Furthermore, the UEs 210-1 and 210-2 may communicate with each other through the eNB 220.

The UE 210-1 transmits the operation signal to the UE 210-2, and thus may perform operation of the UE 210-2.

For example, in a case where the UE 210-2 is attached to a vehicle of which automatic driving is possible, the UE 210-1 may perform an operation relating to the automatic driving with the operation signal. In a case where the UE 210-1 is attached to a vehicle or a roadside apparatus, the operation relating to the automatic driving may be performed with inter-vehicle communication or with communication with the vehicle and the roadside apparatus.

Furthermore, in a case where the UE 210-2 is a robot that handles medical equipment, the UE 210-1 may perform an operation relating to the medical equipment with the operation signal.

The eNB 220 is an example of the base station. Examples of the base station may include a macro-base station, a micro-base station, a femto base station, a pico base station, a metro-base station, a home base station, a wireless signal transmission and reception apparatus that is connected to a Centralised-RAN (C-RAN), and the like. It is noted that RAN is abbreviation of Radio Access Network. Furthermore, the wireless area that is formed by the base station may be a cell or a sector. Cells may include a macro-cell, a micro-cell, a femto cell, a pico cell, a metro-cell, a home cell, and the like.

The eNB 220 performs wireless communication with the UE 210, and thus relays communication with the UE 210. The wireless communication may be performed using a radio resource that is allocated by the eNB 220 to the UE 210. It is noted that the radio resource may be a resource associated with time and a resource. Furthermore, the eNB 220, for example, may be connected to the MME 230 through an S1 interface.

The MME 230 accommodates the eNB 220, and performs Control Plane (C-plane) processing for network control.

The SGW 240 and the PGW 250 is an example of a gateway on the packet core network 280. For example, the SGW 240 processes User Plane (U-plane) data (user data). The PGW 250 may be connected to the external network 290, and may function as a gateway between an apparatus, such as the UE 210, within the wireless communication system 200, and the external network 290. The network 290, for example, may be a packet data network such as the Internet or a corporate intranet.

At this point, in the wireless communication system 200, in each of the wireless access network 270 and the packet core network 280, the transfer of the signal is controlled using QoS.

QoS, for example, may be controlled with Policy and Charging Control (PCC). PCC is an example of a control technique relating to a policy and billing, and QoS is equivalent to a policy for PCC.

PCC is configured with three entities, PCRF, Policy and Charging Enforcement Function (PCEF), and Bearer Binding and Event Reporting Function (BBERF). It is noted that in FIG. 9, the PCRF 260 and PCEF 251 are illustrated and the BBERF is not illustrated, but that the wireless communication system 200 may include the BBERF. For example, the BBERF may be included in the SGW 240.

The PCRF 260 determines policy information that is to be applied to a packet, according to information on a contract into which a user enters and/or an application that the user uses. The policy information may include some kind of policy to be applied to a packet, a billing rule, and information or the like that specifies a packet which is a target for control due to these pieces of the information. In this manner, the PCRF 260, for example, may manage QoS and/or QCI.

It is noted that, for example, priority control, a rule in the gateway for determining whether or not transfer is allowed, or the like may be included in the policy information. For example, a rule for billing or the like in accordance with a quantity of packets may be included in the billing rule. Internet Protocol (IP) addresses, port numbers, or the like of a transmission source or a destination may be included in the information that specifies the packet that is a target for control.

The PCEF 251, for example, is included in the PGW 250, and, according to information that is notified by the PCRF 260, performs the policy control on a per-IP flow basis and performs billing.

It is noted that the term "notification" may be used as a term which means that a signal which includes information in a notification target is transmitted from the transmission source to a transmission destination and the signal is received in the transmission destination (or the information on the notification transmission target is further recognized in the transmission destination). The signal that includes the information on the notification target may have the form of any one of a wireless signal, an optical signal, and an electric signal, and may be converted into the form of any other signal during the "notification". The signal that includes the information on the notification target may be referred to as a control signal. Furthermore, the notification may be referred to as signaling.

The BBERF performs the same processing as the PCEF 251, but does not perform billing processing. Furthermore, the BBERF performs processing for coordination with QoS control that is specific to an access system. For example, specification or the like of an LTE wireless access bearer that transfers a packet which is received from the PGW 250, to the eNB 220, may be included in the processing for coordination.

(Management of QoS)

In the wireless communication system 200, a communication-channel (for example, a bearer in 3GGP) is set up according to an attribute of QoS and/or QCI, based on a service or a type of user data that is transferred from the UE 210. The communication-channel setting may be performed according to a policy that is stored in the PCRF 260.

Included in the service may be a Real Time (RT) service such as audio or live image, an image such as Video On Demand (VOD) or streaming, or a Non-Real Time (NRT) service such as a file transfer.

For example, in an apparatus involved in communication from the dispatch source or the transmission source (for example, the UE 210-1) to a dispatch destination or the transmission destination (for example, the UE 210-2), communication-line control may be performed according to an attribute that is based on QoS and/or QCI, and transfer of the user data may be performed. As examples of the apparatus involved in the communication, the PGW 250, the PCEF 251, the MME 230, the SGW 240, the eNB 220, and the UE 210 are given.

At the time of the service setup or bearer setup, QoS may be set on a per-service basis or a per-bearer basis.

(Communication-Connection Setup)

Next, the communication-connection setting in the wireless communication system 200 will be described below. In the wireless communication system 200, a bearer between UEs 210 or between the eNB 220 to which the UE 210 that is a transmission source makes a connection and the SGW 240, and a bearer between the eNB 220 to which the UE 210 that is a transmission destination makes a connection and the SGW 240 that is at a higher level than the transmission destination may be set up. Furthermore, a communication path may be set up between the SGW 240 that is at a higher layer than the transmission source and the SGW 240 that is at a higher layer than the transmission destination. It is noted that the bearer, for example, may be a wireless access bearer.

The transfer delay, the transfer error rate, whether or not to perform transfer speed guarantee, a priority, and the like may be set for these bearers and the communication path according to QoS and/or QCI. The transfer delay, for example, may be a maximum transfer delay or "Packet delay Budget", and the transfer error rate, for example, may be "Packet Error Loss Rate", a Frame Error Rate (FER), or the like. In the wireless communication system 200, data such as the user data, for example, a packet, may be transferred according to these settings.

In other words, an apparatus that is at a higher layer than the eNB 220 sets up a communication-connection that is to be set up between the eNB 220 to which the UE 210 that is a transmission source makes a connection and the eNB 220 to which the UE 210 that is a transmission destination, based on QoS and/or QCI or these attributes, and thus, may perform the communication-connection control.

Furthermore, in the eNB 220, the UE 210 that is a communication partner may be selected, and scheduling may be performed that selects a radio resource, a modulation scheme, a coding rate, and the like, which are used for transfer (for example, uplink transfer and/or downlink transfer) to and from the selected UE 210. It is noted that, in the case of LTE, for example, the radio resource may be configured with a frequency-axis direction (a subcarrier) and a time-axis direction (a subframe or a slot).

The scheduling may be performed considering a transfer speed (for example, a maximum transfer speed or the guaranteed transfer speed) that is set with QoS and/or QCI, an error rate, a priority, a transfer delay, and the like. For example, in a case where the guaranteed transfer speed is specified, or in a case where the priority or the like is specified, the eNB 220 may select a terminal in a manner that satisfies a condition such as the guaranteed transfer speed or the priority, may select an amount of transmission data (for example, a quantity of allocated radio resources), and may select a modulation scheme. Furthermore, in a case where the error rate is specified, the eNB 220 may select a coding rate, or may select a radio resource that has good wireless communication-channel quality.

In this manner, the eNB 220 performs wireless communication-channel control using QoS and/or QCI that is notified by a higher-layer apparatus.

Regarding QoS for transferring the operation signal that is newly added in the second embodiment, detail information such as the maximum transfer delay may be stored in the PCRF 260. Then, QoS for transferring the operation signal may be used for control of the PCRF 260, the PCEF 251, the PGW 250, the MME 230, the SGW 240, the eNB 220, and the UE 210, and all apparatuses.

Furthermore, in the PGW 250, the SGW 240, and the UE 210, data transfer may be performed according to QoS setting for transferring the operation signal. Furthermore, control in accordance with QoS for transferring the operation signal may be performed on wireless transfer between the eNB 220 and the UE 210, and the data transfer may be performed.

It is noted that bearers include a default bearer and a dedicated bearer. The dedicated and default bearers may be used for different purposes: the dedicated bearer for GBR (the transfer speed guarantee) and the default for Non-GBR (non-transfer speed guarantee). Alternatively, in some cases, the default bearer may correspond to both GBR and Non-GBR.

[2-2] Example of Operation of the Wireless Communication System

Next, an example of operation of the wireless communication system 200 that is configured above will be described with reference to FIGS. 10 to 12.

[2-2-1] Example of an Operation of Setting QoS

First, an example of an operation of setting QoS in the wireless communication system 200 is described. As illustrated in FIG. 10, wireless control communication-channel setup, for example, random access is performed between the UE 210 and the eNB 220 (Processing T1).

Subsequently, the UE 210 transmits an attach request to the MME 230 (Processing T2), and registration of the UE 210 is performed on a wireless network, for example, the wireless access network 270. The MME 230 makes a request to the SGW 240 for setup of a wireless access bearer (Processing T3). It is noted that, in the following description, in some cases, the wireless access bearer is referred to simply as a bearer.

The SGW 240 that receives the request for the bearer setup notifies the PGW 250 of a path setup request (Processing T4). Accordingly, path setup for the core network, for example, the packet core network 280 is requested.

The PGW 250 that receives the path setup notification makes a request to the PCRF 260 for control information for performing the policy control (Processing T5).

The PCRF 260 notifies each of the PGW 250 and the SGW 240 of policy control information on QoS and/or QCI or the like, or packet specification information indicating to which QoS and/or QCI a packet corresponds (Processing T6 and Processing T7).

QoS and/or QCI, and attributes of or attribute values of these may be included in the policy control information. For example, a QoS class and attributes of each class, and/or QCI and an attribute thereof may be included in the policy control information. It is noted that, as attributes of each class, for example, a maximum transfer delay, an error rate (for example, a Packet Error Rate (PER) or the like), a transfer speed, a guaranteed transfer speed (for example, GBR), and the like may be included.

Based on the policy control information that is notified by the PCRF 260, the PGW 250 (or the PCEF 251) that receives the notification notifies the SGW 240 of a path setup response and performs the path setup.

As an example, the PGW 250 (or the PCEF 251) that receives the notification performs the path setup based on the policy control information that is notified by the PCRF 260 (Processing T8). In the path setup, a path for the core network between the SGW 240 and the PGW 250, and/or a path between the PGW 250 and the PGW 250 that is at a higher layer than the UE 210 that is a transmission destination is set up. At this time, the communication-connection control of a path may be performed in such a manner that QoS and/or QCI, and attributes of or attribute values of these are satisfied.

Furthermore, based on the policy control information, the PGW 250 (or the PCEF 251) notifies the SGW 240 of the path setup response (Processing T9).

Accordingly, in the wireless communication system 200, the transfer of the user data may be controlled in such a manner that QoS and/or QCI, and attributes of or attribute values of these are satisfied.

Next, based on the policy control information that is notified by the PCRF 260, the SGW 240 (or the BBERF) that receives the notification transfers the control information to the eNB 220 using a context setting request, and sets up a bearer between the SGW 240 and the eNB 220.

As an example, based on the policy control information that is notified by the PCRF 260, the SGW 240 (or the BBERF) that receives the notification performs the policy control (which may include the communication-channel control) (Processing T10). At this time, a bearer is set up in such a manner that QoS and/or QCI, and attributes of or attribute values of these are satisfied.

It is noted that a plurality (or all) of services or QoSs may be gathered and thus be set as one bearer and that in this case, bearer setup may be performed based on the strictest attribute value (for example, a value that corresponds to the smallest amount of transfer delay, in the case of the transfer delay) of QoS. Alternatively, a dedicated bearer may be set up for a plurality (or all) of services or QoSs.

Furthermore, based on the policy control information, the SGW 240 (or the BBERF) performs a bearer setup response to the MME 230 (Processing T11). The MME 230 transfers the control information to the eNB 220 using the context setting request (Processing T12).

Accordingly, in the wireless communication system 200, the transfer of the user data between the SGW 240 and the eNB 220 may be controlled in such a manner that QoS and/or QCI, and attributes of or attribute values of these are satisfied.

The eNB 220 that receives the context setting request performs wireless data communication-channel setup between the eNB 220 itself and the UE 210 (Processing T13). In the wireless data communication-channel setup, an attach completion notification may be transmitted to the UE 210.

Subsequently, the eNB 220 transmits a context setting response to the MME 230 (Processing T14), and the UE 210 transmits an attach completion response to the MME 230 (Processing T15).

Furthermore, the MME 230 transmits bearer update request to the SGW 240 (Processing T16), and the PGW 250 that receives the bearer update request performs bearer update and transmits a bearer update response to the SGW 240 (Processing T17).

With the above-described processing, in the wireless communication system 200, a wireless data communication-channel between the UE 210 and the eNB 220, a wireless access bearer between the eNB 220 and the SGW 240, and communication path between the SGW 240 and the PGW 250 or between the PGW 250 and any other PGW 250 are set up.

Information on QoS and/or QCI, and the like according to the second embodiment, which is newly added, may be added, as information or an attribute value (a parameter) that is used for setting or control, to existing information, for the path setup for the sequence described above, the bearer setup, the context setting, and the control of these.

Figure 10:
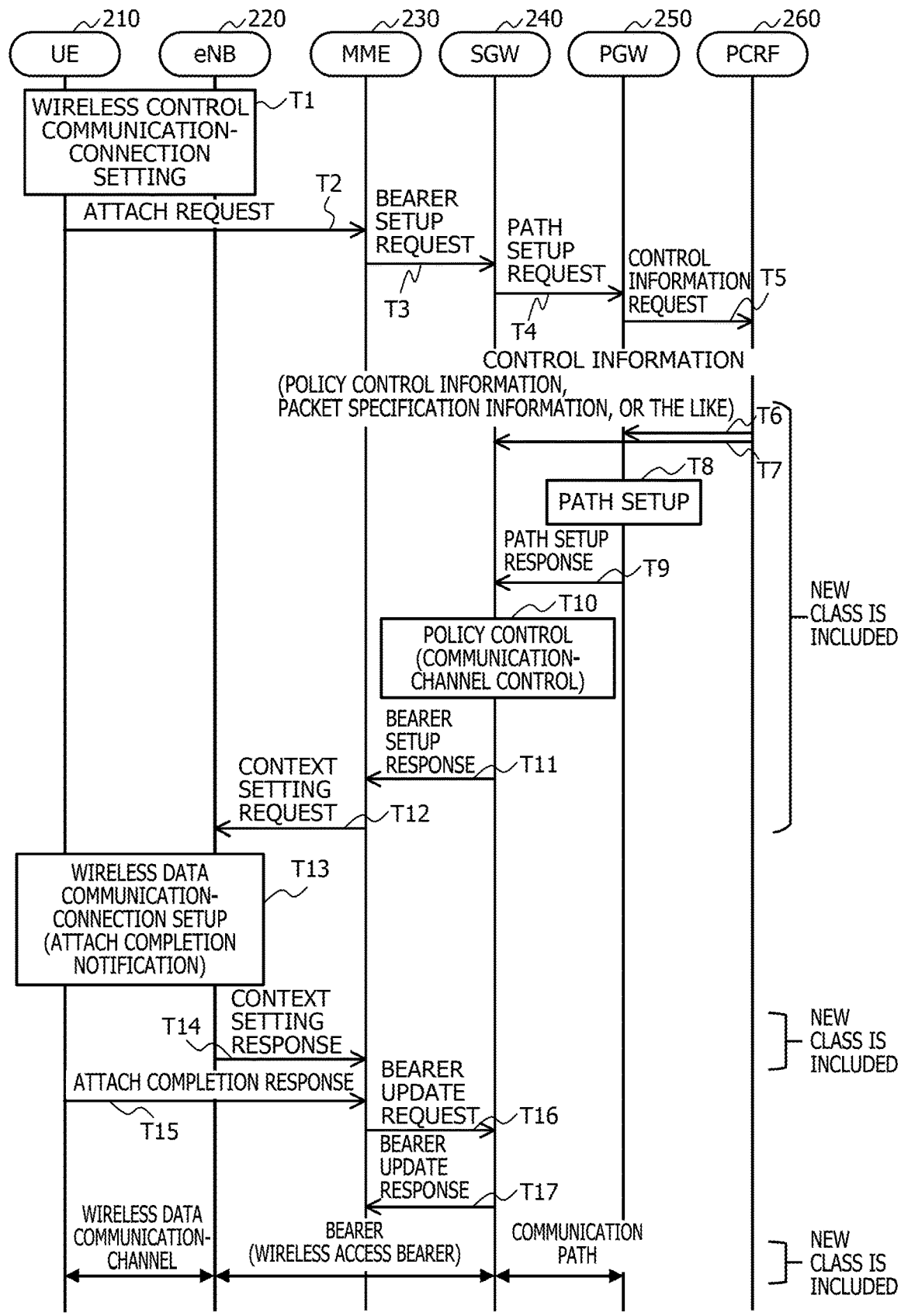
FIG. 10 is a diagram illustrating an operation sequence for QoS setting in the wireless communication system according to the second embodiment.

For example, as illustrated in FIG. 10, with Processing T6 to Processing T12, Processing T14, and the communication-channel or path setup or control, in addition to the existing QoS and/or QCI, QoS and/or QCI that is newly added may be used.

It is noted that QoS and/or QCI and attributes or the like of these may be notified in advance by the PCRF 260 to the PGW 250, the PCEF 251, the MME 230, the eNB 220, and the UE 210, and may be stored in advance in these apparatuses. In the above description, it is assumed that QoS and/or QCI and attributes or the like of these are notified to each apparatus after being set for the PCRF 260.

[2-2-2] Example of a Scheduling Operation

Next, an example of a scheduling operation in the wireless communication system 200 will be described. Based on the context setting request that is received in Processing T12 in FIG. 10, the eNB 220 recognizes QoS and/or QCI and attributes or attribute values of these, and performs downlink or uplink scheduling.

(Case of the Downlink Scheduling)

Figure 11:
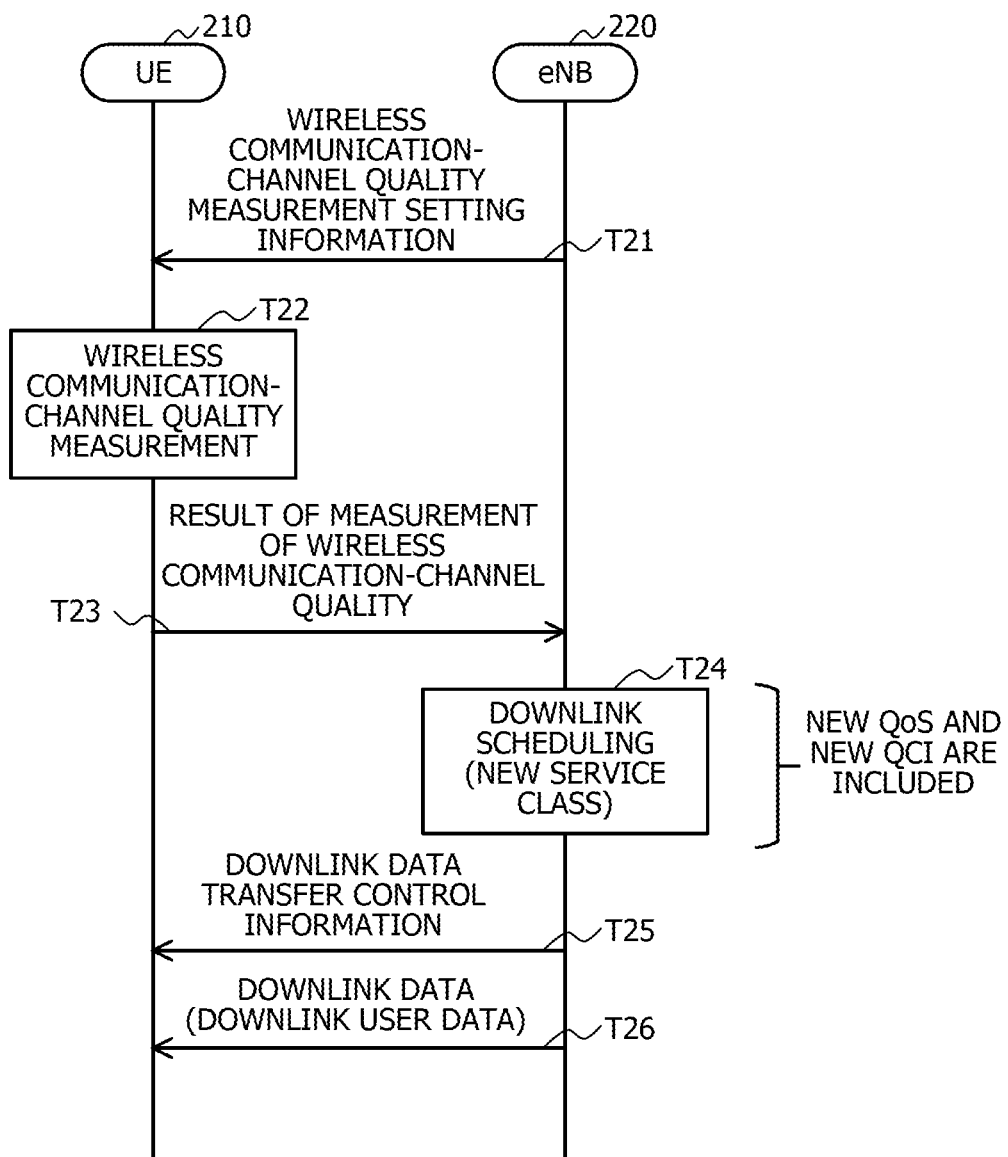
FIG. 11 is a diagram illustrating an example of an operation sequence for downlink scheduling in the wireless communication system according to the second embodiment.

In the downlink scheduling, as illustrated in FIG. 11, the eNB 220 notifies the UE 210 of measurement setting information on downlink wireless communication-channel quality (Processing T21). The measurement setting information on the downlink wireless communication channel quality, for example, may include a pilot (for example, a Reference Signal (RS) in LTE), and may be notified to UE 210 separately from the pilot.

The UE 210 performs downlink wireless communication channel quality measurement based on the received measurement setting information on the downlink wireless communication channel quality (Processing T22), and notifies the eNB 220 of a result of the measurement of the downlink wireless communication channel quality (Processing T23). It is noted that the UE 210 may create wireless communication channel quality information based on the result of the measurement, and may notify the eNB 220 of the created wireless communication channel quality information. An example of the wireless communication channel quality information, Channel Quality Indicator (CQI) or Reference Signal Received Power (RSRP) is given.

The eNB 220 performs downlink scheduling using the result of the measurement of the downlink wireless communication-channel quality, which is received from the UE 210, and service classes that are recognized based on the context setting request which is received in Processing T12 in FIG. 10, and attributes of or attribute values of these (Processing T24). In the downlink scheduling, the scheduling may be performed in such a manner that QoS and/or QCI, and attributes of or attribute values of these are satisfied.

Subsequently, the eNB 220 notifies the UE 210 of downlink data transfer control information that is obtained with the downlink scheduling (Processing T25). It is noted that the UE 210 that is selected by the eNB 220, and the radio resource, the modulation scheme, and the coding rate, which are used for downlink data transfer, may be included in the downlink data transfer control information. The downlink data transfer control information may be referred to as wireless communication channel control information.

Furthermore, the eNB 220 transmits downlink data (for example, downlink user data) to the UE 210 using the downlink data transfer control information (Processing T26). It is noted that, in a case where the UE 210 performs communication for a plurality of services, the eNB 220 may select user data that is to be transmitted to the UE 210, from among pieces of downlink user data for the plurality of services, according to the above-described attribute (for example, the transfer speed or the priority) of QoS and/or QCI. For example, in a case where a file and audio data are present in the pieces of downlink user data for the plurality of services, the audio data may be preferred.

(Case of Uplink Scheduling)

Figure 12:
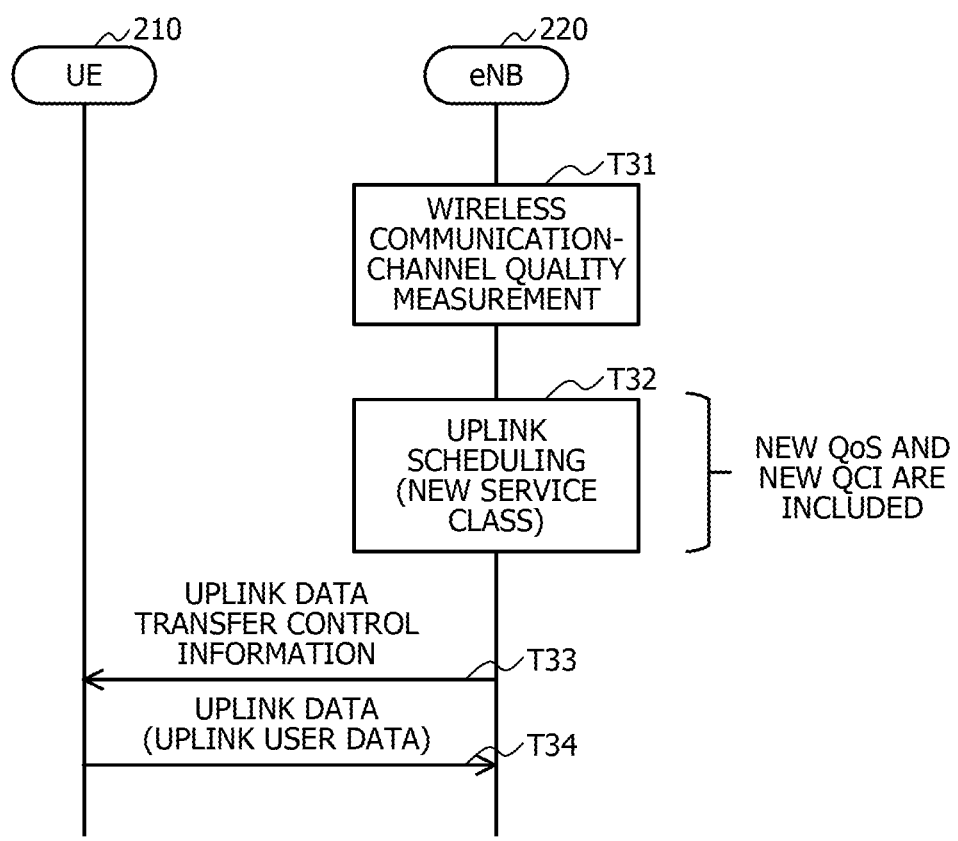
FIG. 12 is a diagram illustrating an example of an operation sequence for uplink scheduling in the wireless communication system according to the second embodiment.

In the uplink scheduling, as illustrated in FIG. 12, the eNB 220 performs uplink wireless communication channel quality measurement (Processing T31). For example, the eNB 220 may receive the pilot (for example, the RS or Sounding Reference Signal (SRS)) that is transmitted from each UE 210, and measure uplink wireless communication channel quality.

Then, the eNB 220 performs the uplink scheduling using a result of measurement of the uplink wireless communication channel quality, QoS and/or QCI and attributes of or attribute values of these, which are recognized based on the context setting request that is received in Processing T12 in FIG. 10, and the like (Processing T32). In the uplink scheduling, the scheduling may be performed in such a manner that QoS and/or QCI, and attributes of or attribute values of these are satisfied.

Subsequently, with the uplink scheduling, the eNB 220 notifies the UE 210 of uplink data transfer control information (Processing T33). The radio resource, the modulation scheme, the coding rate, and the like, which are used for uplink data transfer, may be included in the uplink data transfer control information.

It is noted that the UE 210 may establish a wireless communication channel between the UE 210 itself and the eNB 220, may establish a communication channel between a higher layer apparatus and the eNB 220, and then may notifying the higher layer apparatus of a service (for example, audio, real-time moving image, or the like) that is selected by a user, through the eNB 220. According to the notification, the higher-lever apparatus may set QoS and/or QCI that is applied for communication by the UE 210. Because QoS and/or QCI, attributes of these, and the like are stored in advance in the PCRF 260, the communication channel setup is performed in the higher-layer apparatus according to the attributes.

The UE 210 transmits uplink data (for example, uplink user data) to the eNB 220 using the uplink data transfer control information that is notified by the eNB 220 (Processing T34).

The information on QoS and/or QCI, and the like according to the second embodiment, which is newly added, may be added, as information or an attribute value (a parameter) that is used for scheduling or control, to the existing information, for scheduling of a sequence or control thereof in FIGS. 11 and 12, which is described above. For example, as illustrated in FIGS. 11 and 12, with the setup or control in Processing T24 to Processing T32, in addition to the existing QoS and/or QCI, QoS and/or QCI that is newly added may be used.

It is noted that, in an example in FIG. 9, in a case where the UE 210-1 transmits the operation signal to the UE 210-2 as an example of a device, the UE 210-1 may transmit the operation signal to the eNB 220 using uplink data transfer control information that is obtained with the uplink scheduling. In this case, the UE 210-2 may receive the operation signal from the eNB 220 using the downlink data transfer control information that is obtained with the downlink scheduling.

[3] Third Embodiment

In the second embodiment, a case is described where the transfer of the operation signal is controlled on a per-service basis or on a per-communication channel basis, using the service class relating to the transfer of the operation signal.

In some cases, for example, operation signals include signals that differ in an allowable maximum delay. For example, due to differences among the operation signals in the operation detail, differences among target portions (for example, moving units) of devices that are operated with the operation signals, or the like, in some cases, it is desired that the allowable maximum delay is shortened as much as possible and in other cases, it does not matter that a maximum delay is lengthened to some extent.

In some cases, although the service class relating to the transfer of the operation signal is added, it is difficult to deal with this situation by changing an attribute such as the allowable maximum delay for every such operation signal.

So, in the third embodiment, an attribute is possibly set for every packet that is transferred with the same QoS and/or QCI, and information indicating this attribute is transferred in a state of being added to the packet.

[3-1] Example of a Configuration of the Third Embodiment

Figure 13:
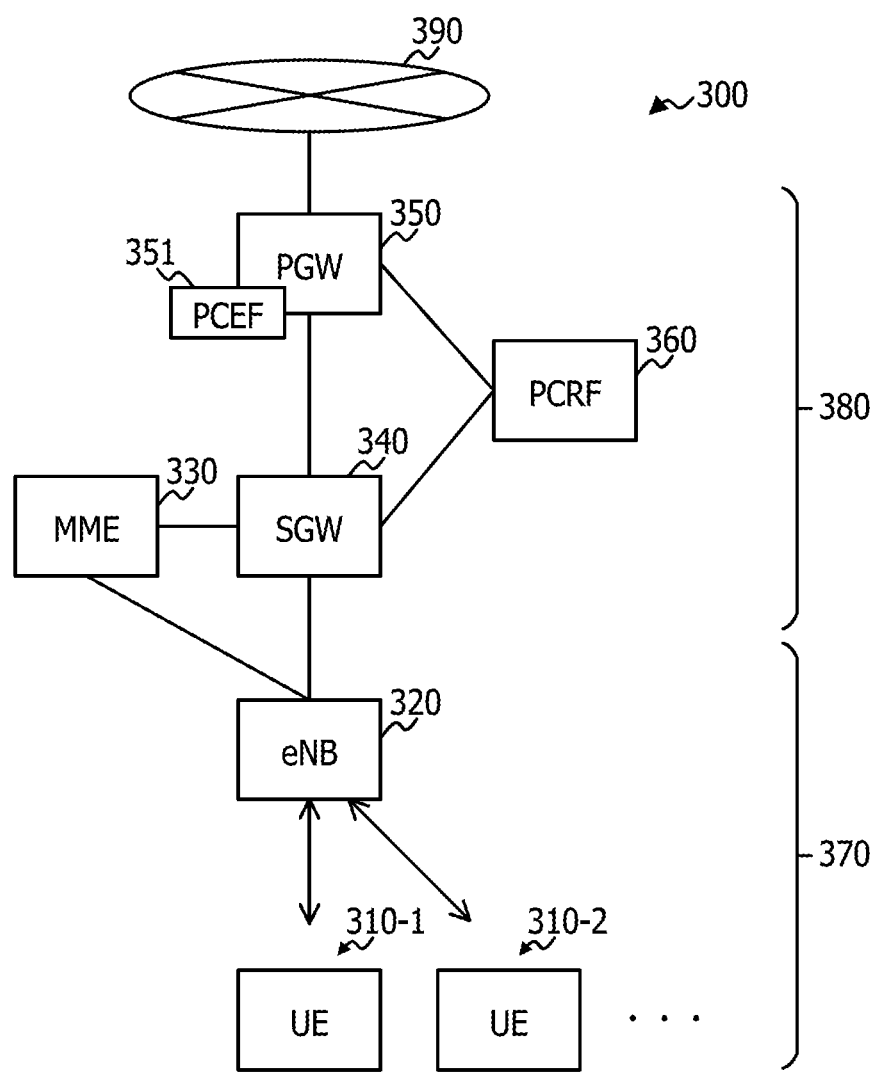
FIG. 13 is a block diagram illustrating an example of a configuration of a wireless communication system according to a third embodiment.

FIG. 13 is a block diagram illustrating an example of a configuration of a wireless communication system 300 according to the third embodiment. The wireless communication system 300, as illustrated in FIG. 13, may include a plurality of UEs (two UEs in an example in FIG. 13), UE 310-1 and UE 310-2, an eNB 320, an MME 330, an SGW 340, a PGW 350 that is connected to a network 390, and a PCRF 360, in an exemplary manner.

The UE 310 and the eNB 320 may be provided on a wireless access network 370 over which wireless communication is performed. Furthermore, the MME 330, the SGW 340, the PGW 350, and the PCRF 360 may form a packet core network 380 over which the packet communication is performed. Moreover, the PGW 350 may include a PCEF 351.

The wireless communication system 300 according to the third embodiment may be the same as the wireless communication system 200 according to the second embodiment, unless otherwise specified. The UE 310, the eNB 320, the MME 330, the SGW 340, the PGW 350, and the PCRF 360 may be the same as the apparatuses, respectively, each of which has the same name in the wireless communication system 200, unless otherwise specified.

(Subclass Setting)

In the wireless communication system 300, for example, a subclass may be set for information of an individual packet or the like that is transferred with a service for which a QoS class is set. Determination of whether or not the subclass is set and determination of the subclass or the like that is to be set may be performed by an application that is executed in each apparatus in the wireless communication system 300.

The subclass is an example of information for changing at least one attribute of a plurality of attributes that are specified with service classes. An attribute value that is different from a value of at least one attribute that is set to be in a service class may be included in the subclass. For example, a value (for example, a real number) of a post-change attribute that is at least one attribute may be set to be in a subclass. Alternatively, a coefficient that applies to (that, for example, is multiplied by) a value of at least one attribute of the plurality of attributes that are specified with service classes may be set to be in a subclass.

As an example, a value or a coefficient of the transfer delay, the transfer error rate, or the guaranteed transfer speed, or any combination thereof may be set to be in a subclass. Furthermore, a plurality of subclasses may be provided for setting these values or every coefficient pattern. For example, in a case where there is a focus on the transfer speed or the transfer delay, as subclasses, four subclasses, "Emergency", "Real time" (high speed), "Medium" (Medium speed), and "Slow" (Slow Speed) may be provided for setting. As another example, in a case where there is a focus on the transfer error rate, as subclasses, three subclasses, "High", "Medium", and "Low" are provided for setting.

FIG. 14 is a diagram illustrating an example of a value that is set to be in a subclass. In an example in FIG. 14, a case where there is a focus on the transfer speed or the transfer delay and where a value in "Packet Delay Budget [ms]" is changed for "Device Control Class", a service class (refer to FIG. 7) for transferring the operation signal that is newly added is illustrated.

For example, in FIG. 7, "50" is set to be in "Packet Delay Budget [ms]". In contrast, in subclasses in FIG. 14, values "25", "40, "50", and "75" for "Packet Delay Budget [ms]" are set to be in "Emergency", "Real time", "Medium", and "Slow", respectively.

FIG. 15 is a diagram illustrating another example of a value that is set to be in a subclass. In an example in FIG. 15, a case where there is a focus on the transfer error rate and where a value in "Packet Error Loss Rate" is changed for "Device Control Class", a subclass (refer to FIG. 7) for transferring the operation signal that is newly added is illustrated.

For example, in FIG. 7, "$10^{-6}$" is set to be in "Packet Error Loss Rate". In contrast, in subclasses in FIG. 15, values "$10^{-8}$", "$10^{-6}$", and "$10^{-4}$" for "Packet Error Loss Rate" are set to be in "High", "Medium", and "Low", respectively.

FIG. 16 is a diagram illustrating an example of a coefficient that is set to be in a subclass. In an example in FIG. 16, a case where there is a focus on the transfer speed or the transfer delay and where a coefficient applies to "Packet Delay Budget [ms]" for "Device Control Class", a service class (refer to FIG. 7) is illustrated.

For example, in subclasses in FIG. 16, coefficients "0.5", "0.75", "1.0", and "1.25" for "Packet Delay Budget [ms]" are set to be in "Emergency", "Real time", "Medium", and "Slow", respectively. As illustrated in FIG. 7, "Packet Delay Budget [ms]": 50 is provided for "Device Control Class", but, in this manner, for example, in the case of "Emergency", a coefficient "0.5" applies, and thus, the maximum allowable delay may be changed to "25" ($\frac{1}{2}$). It is noted that, for example, a coefficient is set to "0.1" and thus the maximum allowable delay for "Device control Class" may be changed to $\frac{1}{10}$ or the like.

FIG. 17 is a diagram illustrating another example of a coefficient that is set to be in a subclass. In an example in FIG. 17, a case where there is a focus on the transfer error rate and where a coefficient applies to "Packet Error Loss Rate" for "Device Control Class", a service class (refer to FIG. 7) is illustrated.

For example, in subclasses in FIG. 17, coefficients "0.01", "1.0", and "100" for "Packet Error Loss Rate" are set to be "High", "Medium", and "Low", respectively. As illustrated in FIG. 7, "Packet Error Loss Rate": "$10^{-6}$" is provided for "Device Control Class", but, in this manner, for example, in the case of "High", a coefficient "0.01" applies, and thus, the transfer error rate may be changed to "$10^{-8}$" ($\frac{1}{100}$).

It is noted that, in the examples in FIGS. 14 to 17, regarding an attribute of a service class that does not change, a value that is the same as an attribute of a service class, or a coefficient (for example, "1.0") that does not change a value is set. Regarding an attribute of a service class that does not change in a subclass, it may be allowed not to set a value or a coefficient to be in a subclass. Accordingly, an amount of information in a subclass may be reduced.

In contrast to FIGS. 14 to 17, FIGS. 18 to 21 are diagrams, each illustrating an example in which values or coefficients are not set for some attributes (for example, attributes that do not change in a subclass). As illustrated in each of FIGS. 18 to 21, a place (an attribute) where a value or a coefficient is set to be in each subclass, as indicated by an underline in FIGS. 14 to 17, is a place (an attribute) where a change is made to a value of an attribute that is specified with a serve class.

It is noted that a value or a coefficient for changing an attribute of a service class, which is included in each subclass, is not limited to one attribute. A value or a coefficient for changing a plurality of attributes, for example, two attributes, "Packet Delay Budget [ms]" and "Packet Error Loss Rate" may be included in each subclass. In this manner, according to a value or a coefficient of an attribute to be changed and a combination of attributes to be changed, a plurality of subclasses may be provided for setting.

Furthermore, in the examples described above, a subclass is described as one in which an attribute of Device Control Class" that is newly added is changed, but is not limited to this. A subclass may be provided as one for changing at least one attribute of a plurality of attributes that are included in the existing service classes.

(Notification of a Subclass)

A subclass, or a value of an attribute or information that is a coefficient may be set in advance to be, for example, in the PCRF 360, and, at the time of the service setup and the communication channel setup, may be notified by the PCRF 360, for example, to the PGW 350, the SGW 340, the MME 330, the eNB 320, the UE 310, and the like. It is noted that the notification from the eNB 320 to the UE 310, for example, may be performed with a signal in a Radio Resource Control (RRC) layer.

Furthermore, the subclass, or the value of an attribute or the information that is a coefficient may be set in advance to be in each apparatus in the wireless communication system 300. In some cases, "subclass" is hereinafter used as a term that means both the class and the value of an attribute or the information that is a coefficient.

The notification of the subclass, for example, may be performed in the same manner as the notification of a new service class in the second embodiment.

(Setting of the Subclass that Applies to the Transfer of the Signal)

The UE 310 may add information relating to the subclass, in other words, the information relating to the attribute value to the operation signal. It is noted that the operation signal is transferred in a packet (for example, an IP packet) on the core network 380 in the wireless communication system 300. Therefore, the information relating to the attribute value may be added to a packet that includes the operation signal.

It is noted that regarding an operation that is possible with a combinational of a plurality of operation signals, the plurality of operation signals may be gathered (for example, as one packet) and thus may be transferred. In this case, for example, information relating to a subclass in which an attribute value, such as the maximum allowable delay, is the smallest of the plurality of operation signals may be added to packets that include the planarity of operation signals, and may be controlled for transfer in the wireless communication system 300.

The information relating to the subclass may be added to the packet through one or both of the following.

(A) Addition to a Header of the IP Packet (B) Addition to MAC Control Element (CE) (MAC CE) of Media Access Control (MAC) PDU (A)

Figure 22:
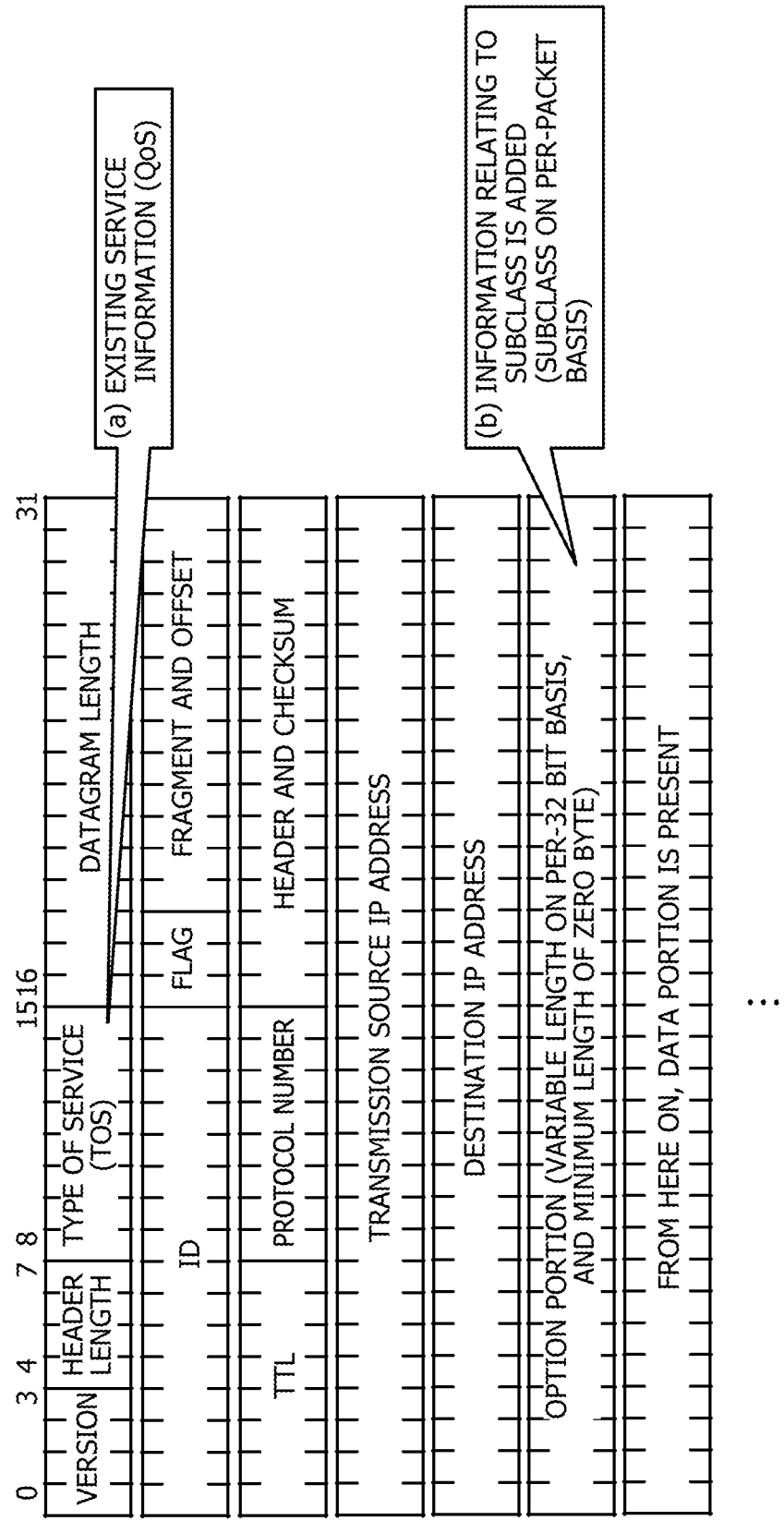
FIG. 22 is a diagram illustrating an example of a configuration of one portion of an Internet Protocol (IP) packet header.

FIG. 22 is a diagram illustrating an example of a configuration of one portion of the IP packet. Existing service information, for example, QoS is set to be in a bit area for "Type of Service (TOS) in (a) of FIG. 22. It is noted that a new service class according to the second embodiment may be included in the existing service information.

On the other hand, information relating to a subclass (in other words, an attribute value) according to the third embodiment, for example, may be added to a bit area for "option portion" in (b) of FIG. 22.

(B)

A MAC PDU is a packet data unit that is processed with a MAC layer. The information relating to the subclass according to the third embodiment may be added the MAC CE of the MAC PDU. For example, a new type of MAC CE that includes the information relating to the subclass may be added.

Figure 23:
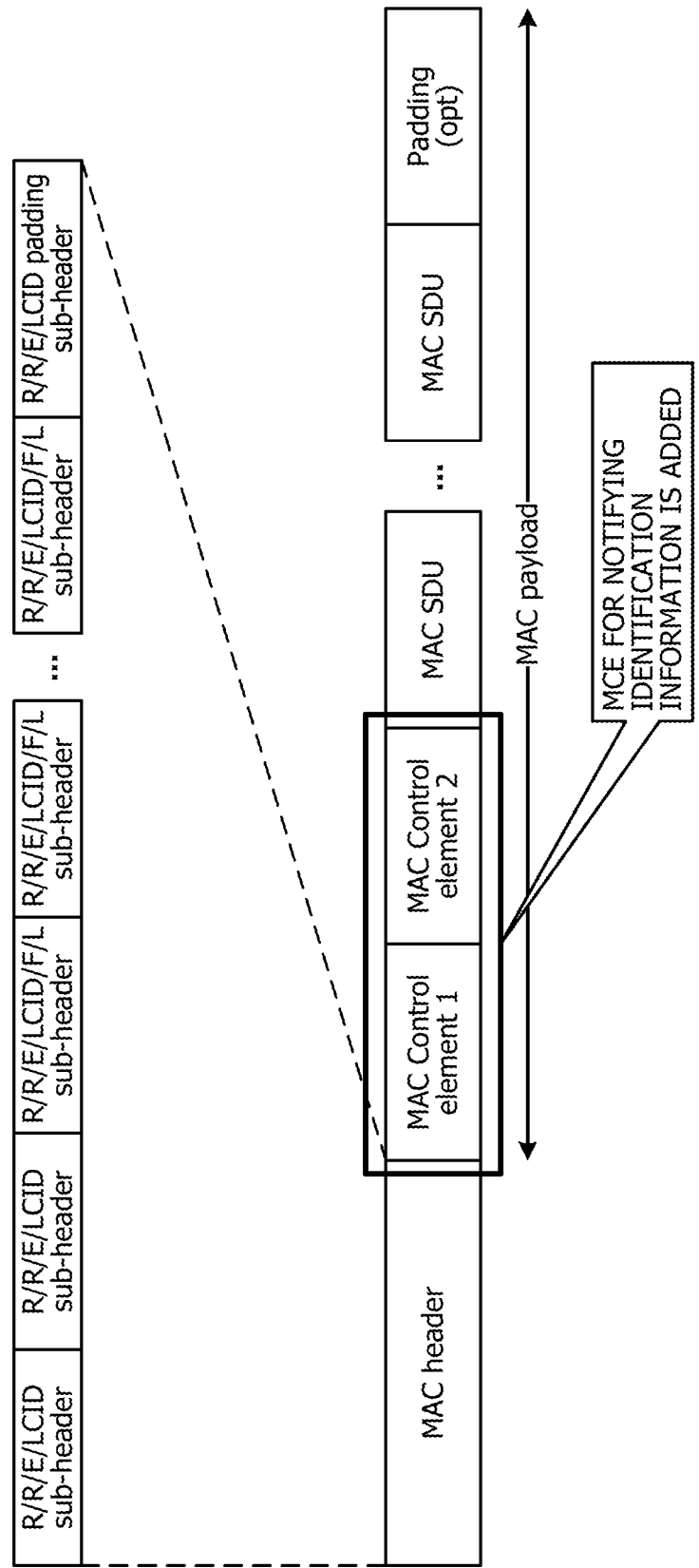
FIG. 23 is a diagram illustrating an example of a configuration of a Media Access Control (MAC) Packet Data Unit (PDU).

FIG. 23 is a diagram illustrating an example of a configuration of the MAC PDU. The MAC CE, for example, is specified in 3GPP TS36.321, V13.0.0.

The MAC PDU is configured with a MAC header and a MAC payload, and the MAC payload is configured with a MAC Service Data Unit (SDU) that is data and a MAC CE. That is, as illustrated in FIG. 23, the MAC CE is information that is positioned between the MAC header and the MAC SDU, and accompanies data.

The MAC CE is a control signal (or control information) that is referred to as L2 signaling or L1/L2 signaling because the MAC is Layer 2 (L2) of the Open Systems Interconnection (OSI) reference model. For example, 12 types of MAC CE are specified in 3GPP TS36. 321, V13.0.0 as follows.

Buffer Status Report
C-RNTI (Cell-Radio. Network Temporary Identifier)
DRX (Discontinuous Reception) Command
UE Contention Resolution Identity
Timing Advanced Command
Power Headroom
Extended Power Headroom
Dual connectivity Power Headroom
MCH (Multicast Channel) Scheduling Information
Extended MCH Scheduling Information
Activation/Deactivation
Long DRX Command In the third embodiment, a new MAC CE that is an example of the information relating to the subclass (in other words, the attribute value) is added to the MAC PDU. The MAC CE that is newly added is hereinafter referred to, in an exemplary manner, as "Packet Quality Control Element".

Each of FIGS. 24 to 27 is a diagram illustrating an example of a format of the MAC CE relating to an attribute value.

Figure 24:
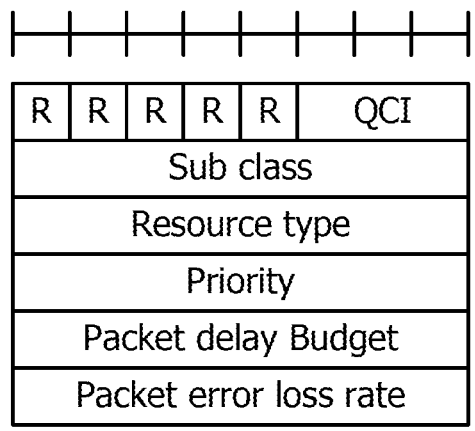
FIG. 24 is a diagram illustrating an example of a format of a MAC Control Element (CE) relating to an attribute value.

FIG. 24 illustrates a case where identification information on the subclass and an attribute value (for example, a value of the attribute, or a coefficient) are set for the MAC CE.

Figure 25:
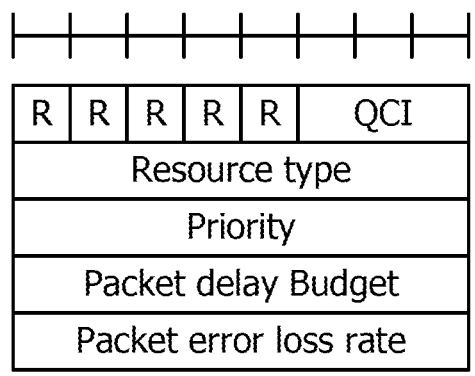
FIG. 25 is a diagram illustrating an example of the format of the MAC CE relating to the attribute value.
Figure 26:
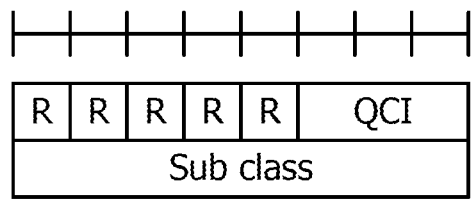
FIG. 26 is a diagram illustrating an example of the format of the MAC CE relating to the attribute value.
Figure 27:
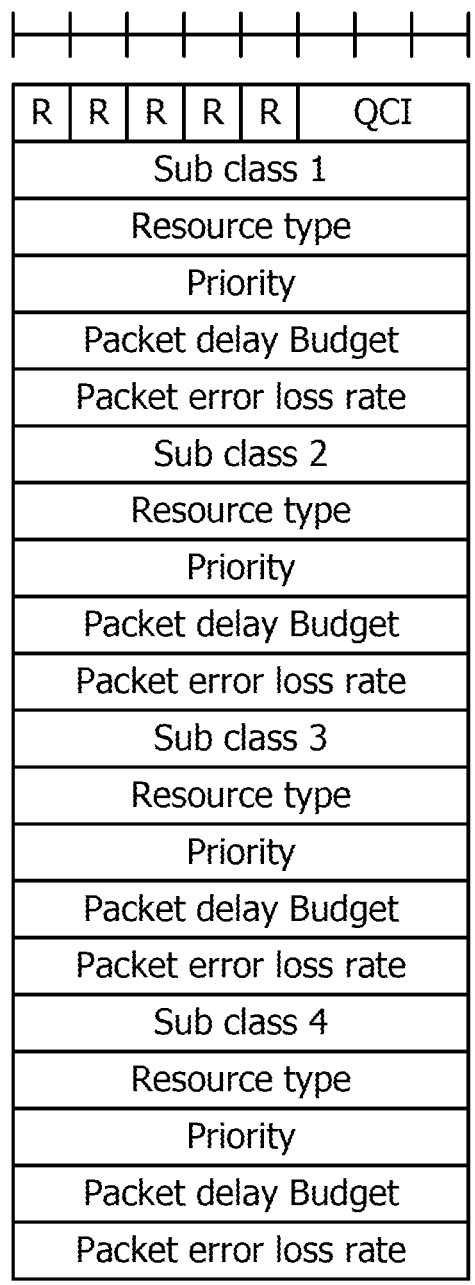
FIG. 27 is a diagram illustrating an example of the format of the MAC CE relating to the attribute value.

A value indicating a number of QCI may be set to be in "QCI" that is illustrated in FIG. 24 (and FIGS. 25 to 27). It is noted that "QCI" may be "QoS" indicating a number of a QoS class. For example, in the case of "QoS", a setting value "001" may be set for "Conversational class", "010" may be set for "Streaming class", and "110" may is set for a new QoS class according to the second embodiment.

The identification information on the subclass may be set to be in "Sub class". As the identification information on the subclass, for example, an index may be used. Along with an information on a service class, pieces of information on a plurality of subclasses may be stored in each apparatus in the wireless communication system 300. With the index that is added to the packet, each apparatus may easily specify a subclass that is used for control of packet transfer, from the plurality of subclasses that are stored.

"Resource type" is an area for indicating whether the resource type is GBR or Non-GBR. "packet delay budget" may be "transfer delay" of QoS. "Packet error loss rate" may be "SDU error rate of QoS.

It is noted that "Resource type" and "Priority" are eight bits (one octet) in length, but that bit areas therefor may be reduced to, for example, one bit and five bits, respective, in length.

Moreover, FIG. 24 illustrates that values or coefficients of four attributes are specified, but a format may be configured only with values of desirable attributes (values or coefficients of attributes) of attributes of QCI or QoS.

FIG. 25 illustrates a case where attribute values are set for the MAC CE without a subclass being specified. As illustrated in FIG. 25, a format may be configured only with attribute values without a subclass being specified.

FIG. 26 illustrates a case where identification information on a subclass is set for the MAC CE without an attribute value being specified. Because each apparatus in the wireless communication system 300 may store pieces of information on a plurality of subclasses, if identification information on a subclass is added to a packet, each apparatus may easily specify an attribute value that applies to the packet. Accordingly, an increase in the quantity of packets that are transferred may be suppressed.

FIG. 27 illustrates a case where a plurality of subclasses and an attribute value of each subclass are set for the MAC CE. A format that is illustrated in FIG. 27 may be used, for example, for a case where the UE 310 notifies the eNB 320 and a higher-layer apparatus of a subclass or causes the eNB 320 and a higher-layer apparatus to learn the subclass.

For example, the UE 310 may notify the eNB 320 of information, which is illustrated in FIG. 27, in a state of being added to a packet, and may cause the eNB 320 to retain or learn the information until communication is ended. Furthermore, the UE 310 may notify the MAC CE for which identification information on a subclass that is illustrated in FIG. 26 is set, after notifying the information that is illustrated in FIG. 27.

As described above, with the wireless communication system 300 according to the third embodiment, a subclass for changing an attribute of a service class is set, and thus the transfer of the operation signal may be controlled using a service class that results from changing an attribute value in a subclass.

Therefore, the operation signal may be transferred at a high speed. Furthermore, the operation signal transfer quality may be improved. Accordingly, the quick response of the operation of the device, which is caused by the wireless terminal, may be improved, and/or the transfer error may be reduced.

Furthermore, in some cases, in a case where, in accordance with an operation signal that has the strictest transfer condition, of a plurality of operation signals that are to be transferred, for example, the maximum allowable delay is set, unnecessary high-speed transfer occurs and throughput of the entire system decreases.

In contrast, with the wireless communication system 300 according to the third embodiment, it is possible that an attribute of a service class is set for every packet in a flexible and optimal manner. Therefore, it is possible that the transfer speed is adaptively controlled. Furthermore, the high-speed transfer is further possible.

[3-2] Example of Operation of the Wireless Communication System

Figure 28:
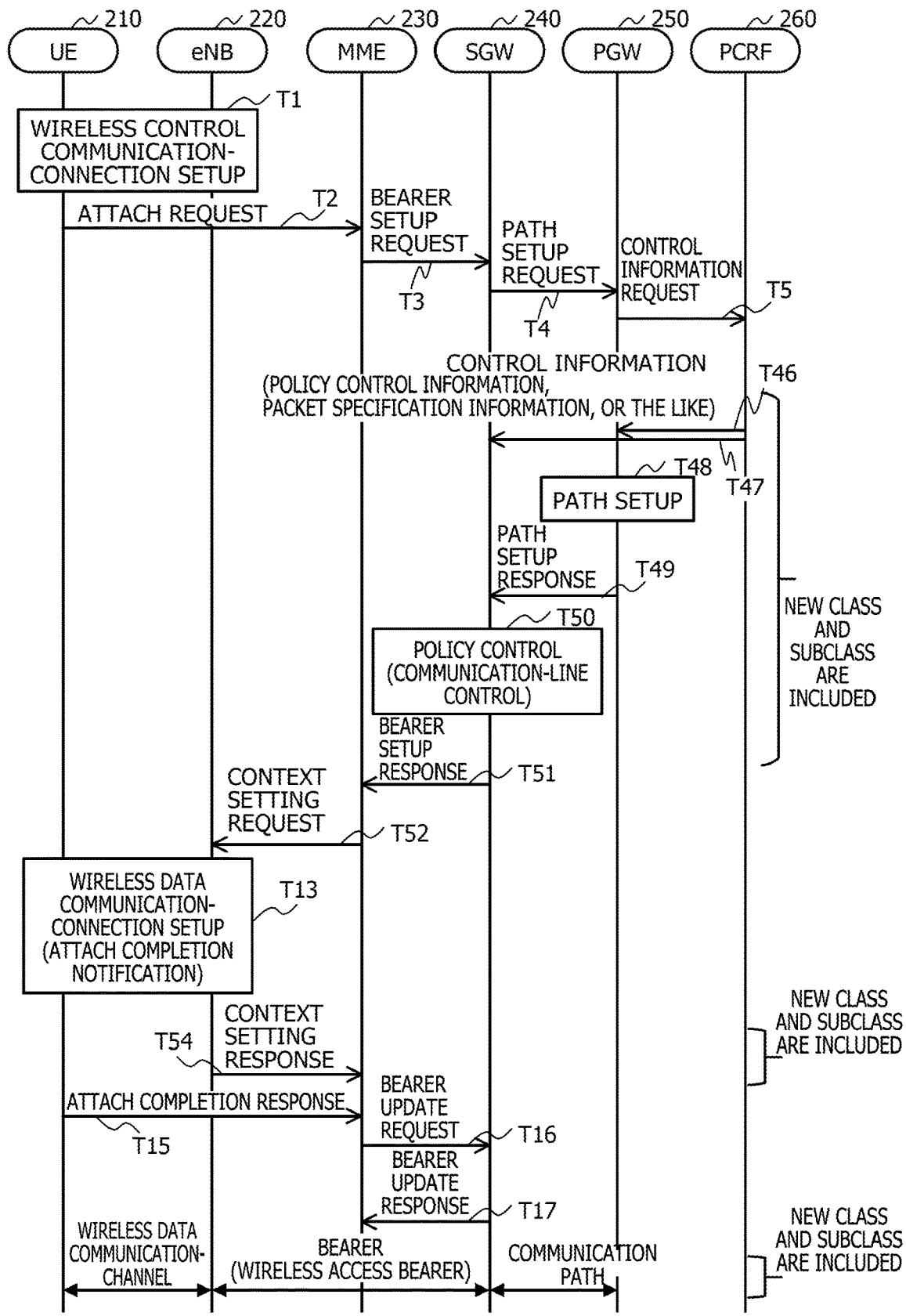
FIG. 28 is a diagram illustrating an operation sequence for QoS setting in a wireless communication system according to a third embodiment.
Figure 29:
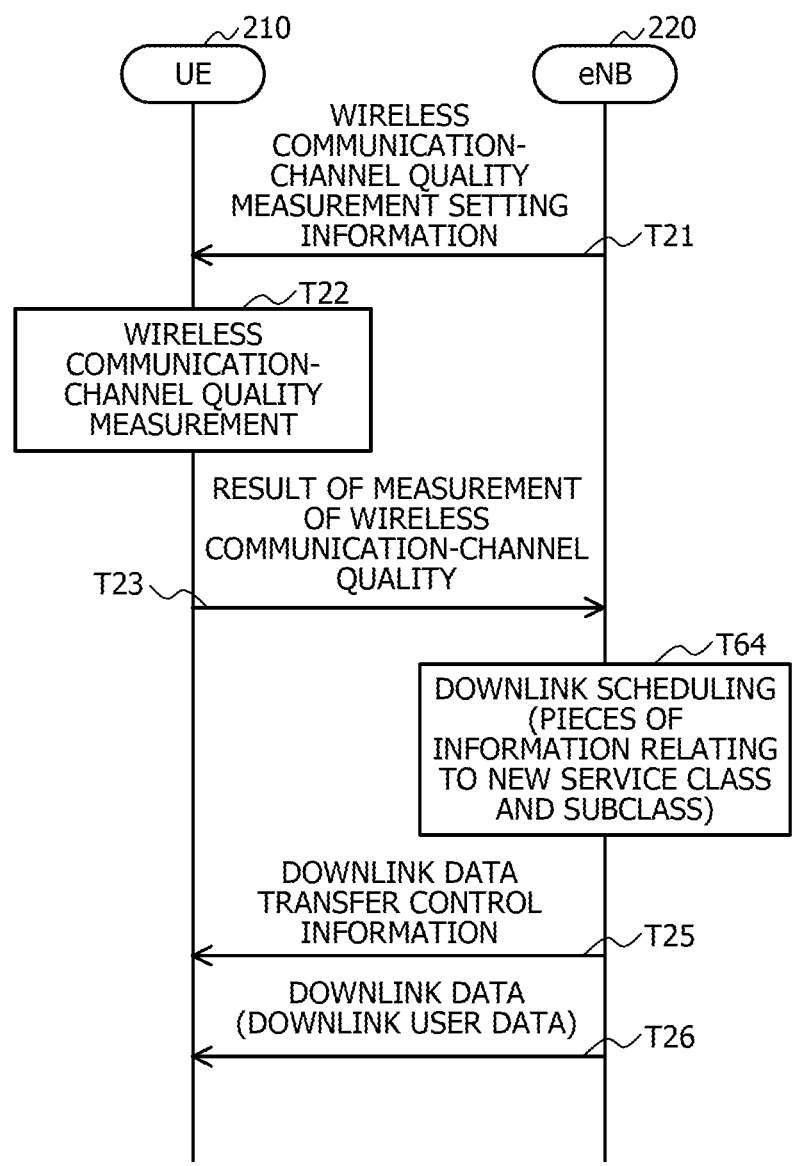
FIG. 29 is a diagram illustrating an example of an operation sequence for downlink scheduling in the wireless communication system according to the third embodiment.
Figure 30:
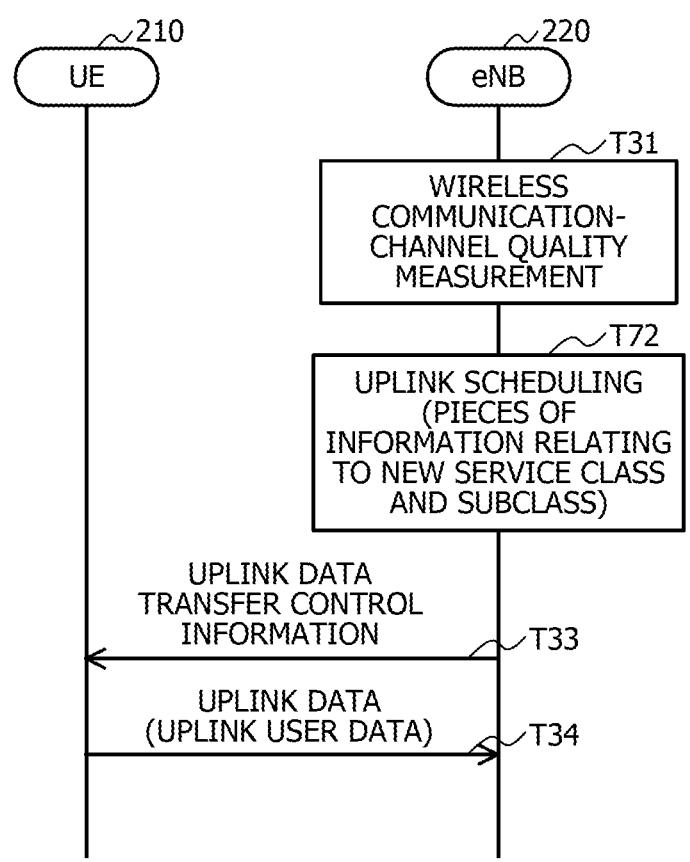
FIG. 30 is a diagram illustrating an example of an operation sequence for uplink scheduling in the wireless communication system according to the third embodiment.

FIG. 28 is a diagram illustrating an example of an operation sequence for the QoS setting in the wireless communication system 300. FIGS. 29 and 30 are diagrams each illustrating an example the operation sequence for the downlink and uplink scheduling in the wireless communication system 300.

The wireless communication system 300 according to the third embodiment may store the details of the information relating to the subclass in the PCC, as is the case with the information relating to the service class according to the second embodiment. For example, for control of all apparatuses, the PCRF 360, the PCEF 351, the PGW 350, the MME 330, the SGW 340, and the eNB 320, and the UE 310, the information relating to the subclass may be used. Furthermore, for the wireless transfer between the eNB 220 and the UE 210, control in accordance with QoS for transferring the operation signal may be performed and the data transfer may be performed.

It is noted that, in a case where all services are transferred over one default bearer, QoS is checked on a per-packet basis, but in the third embodiment, transfer control that uses the information relating to the attribute value is also performed on each of the packets that are transferred with the same service and QoS.

As known from the above description, an example of operation of the wireless communication system 300 according to the third embodiment may be the same as the example of the operation of the wireless communication system 200 according to the second embodiment, except for the following points.

[3-2-1] Example of the Operation of Setting QoS

The information relating to the subclass may be added, as information or an attribute value (a parameter) that is used for setting or control, for the path setup for the sequence according to the second embodiment, which is illustrated in FIG. 10, the bearer setup, the context setting, and control of these.

For example, in FIG. 28, instead of Processing T6 to Processing T12, and Processing T14, which are illustrated in FIG. 10, Processing T46 to Processing T52, and Processing T54 are performed. For Processing T46 to Processing T52, and Processing T54, and setup or control of a communication channel or a path, in addition to information on the existing service class or information on the existing service class that is newly added, the information relating to the attribute value, for example, a value or a coefficient of an attribute, may be used.

[3-2-2] Example of the Scheduling Operation

The information relating to the subclass may be added, as information or an attribute value (or a parameter) that is used for schedule or control, for scheduling of the sequence or control thereof according to the second embodiment, which is illustrated in FIGS. 11 and 12.

For example, in FIG. 29, instead of Processing T24 that is illustrated in FIG. 11, Processing T64 is performed. Furthermore, in FIG. 30, instead of Processing T32 that is illustrated in FIG. 12, Processing T72 is performed. For setup or control in Processing T64 to Processing T72, in addition to the information on the existing service class or information on the existing service class that is newly added, the information relating to the attribute value, for example, a value or a coefficient of an attribute, may be used.

[4] Examples of Configurations of Apparatuses According to the First to Third Embodiments, Respectively Next, examples of configurations of apparatuses in the wireless communication systems 100 and 100A, 200, and 300 according to the first to third embodiments, respectively, which are described above, will be described.

[4-1] Examples of Functional Configurations

Figure 31:
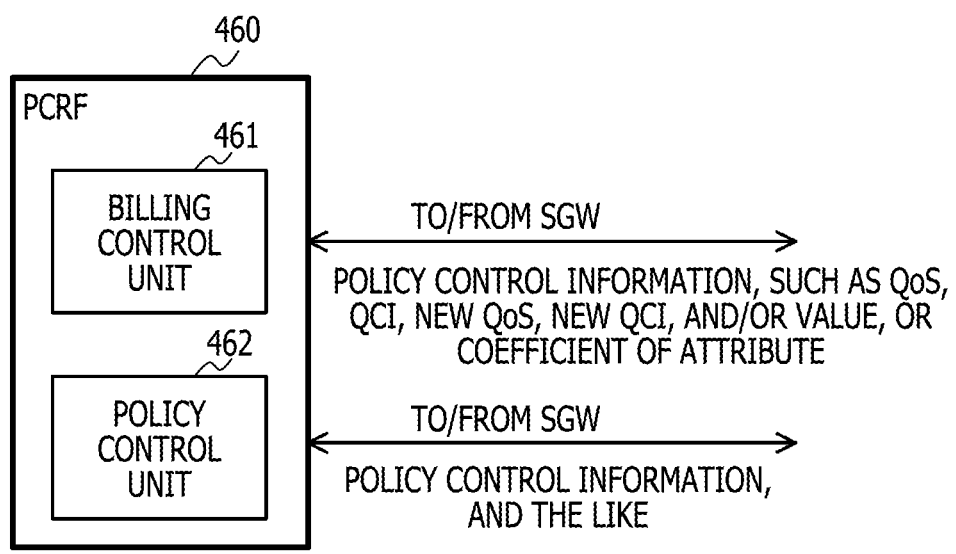
FIG. 31 is a block diagram illustrating an example of a functional configuration of a Policy and Charging Rules Function (PCRF).
Figure 32:
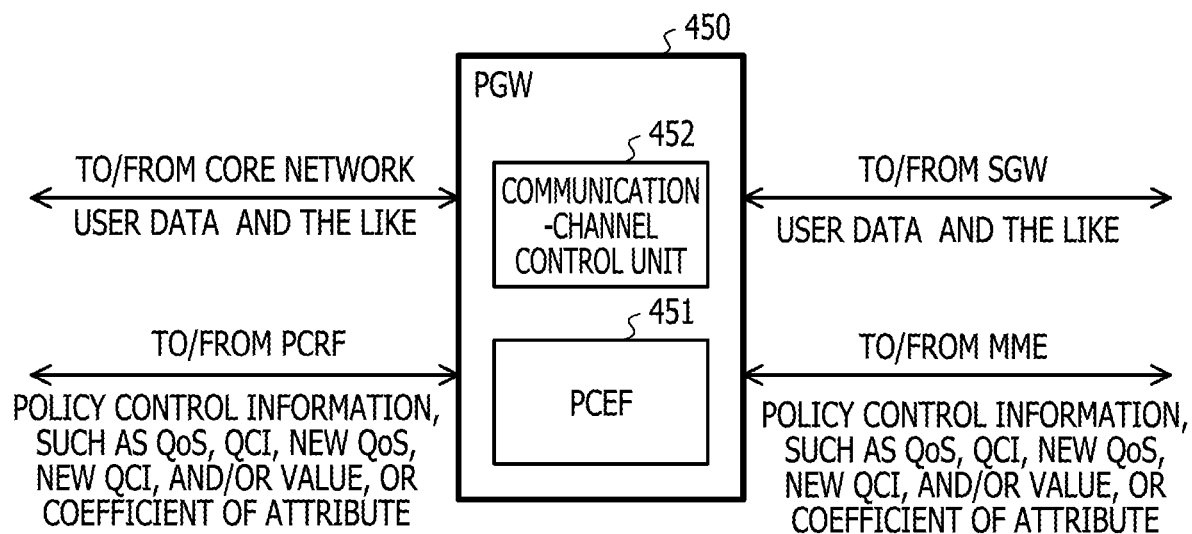
FIG. 32 is a block diagram illustrating an example of a functional configuration of a Packet Data Network (PDN) Gateway (PGW).
Figure 33:
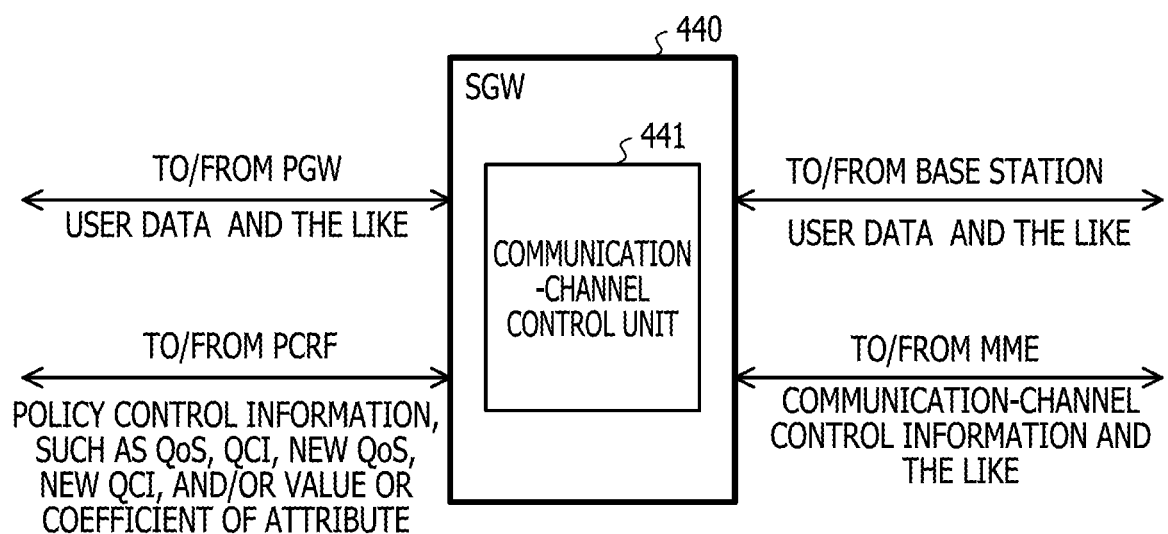
FIG. 33 is a block diagram illustrating an example of a functional configuration of a Serving Gateway (SGW).
Figure 34:
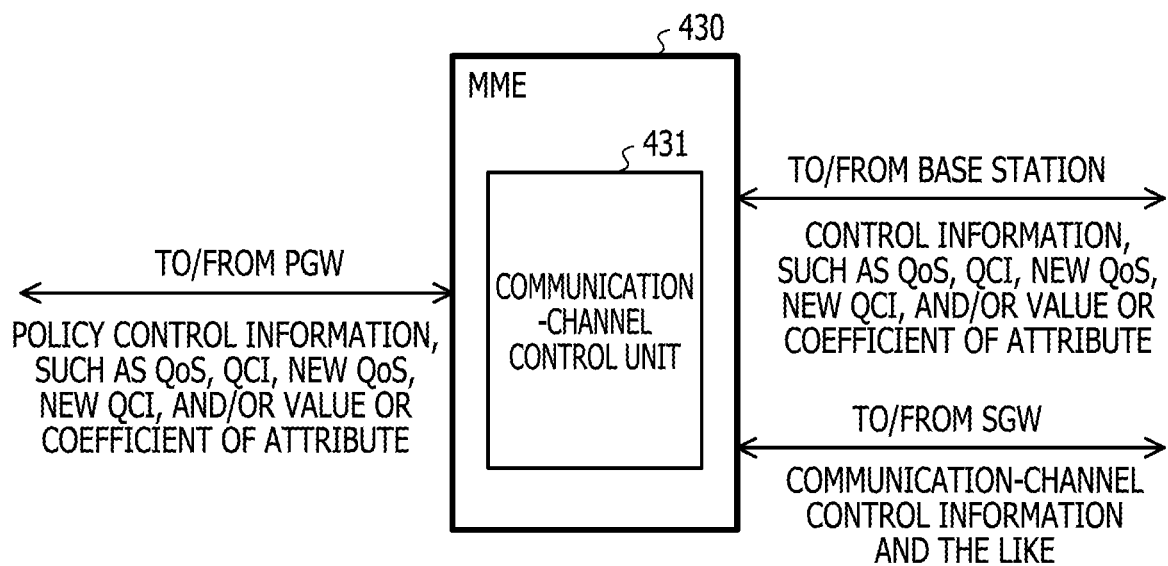
FIG. 34 is a block diagram illustrating an example of a functional configuration of a Mobility Management Entity (MME).
Figure 35:
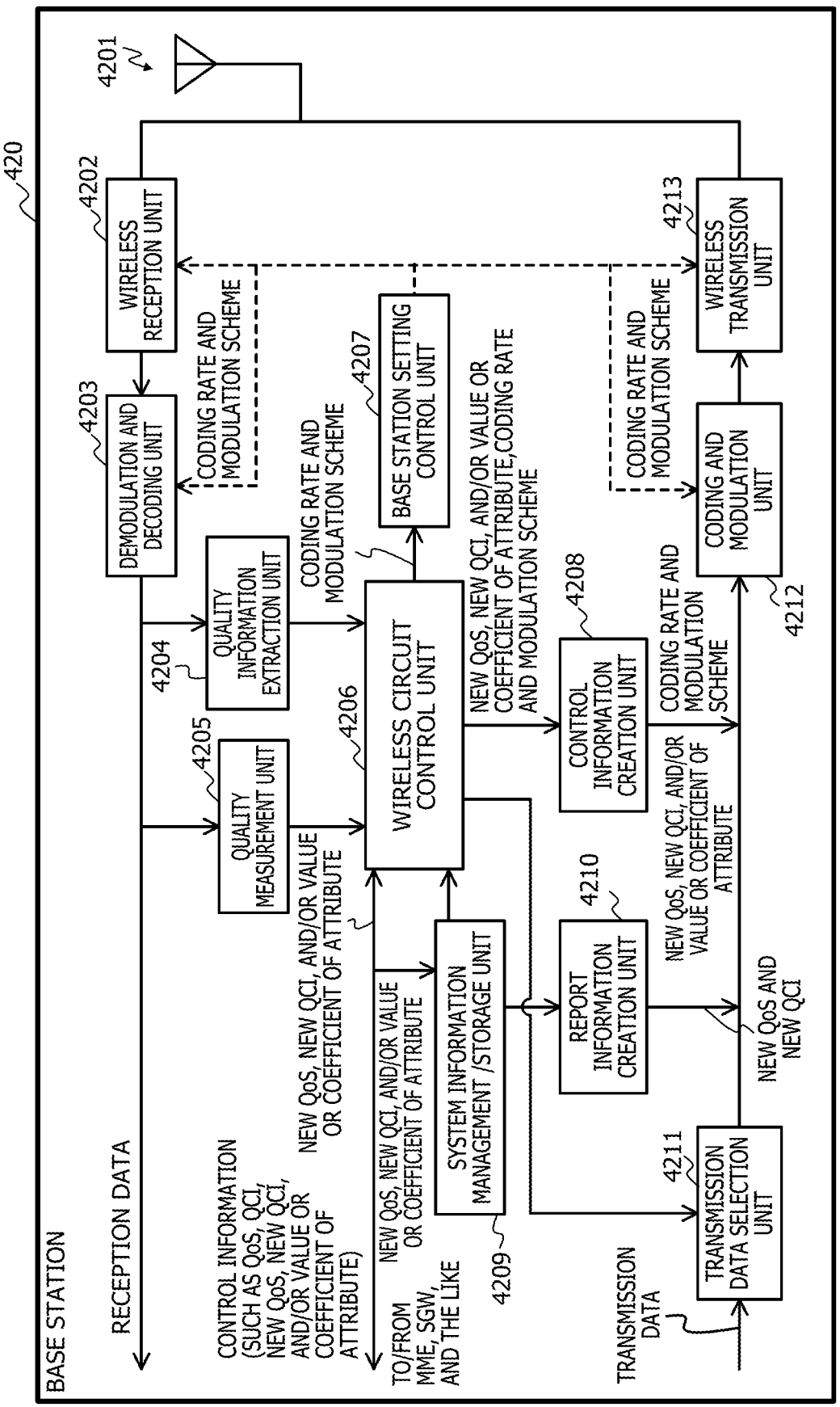
FIG. 35 is a block diagram illustrating an example of a functional configuration of a base station.
Figure 36:
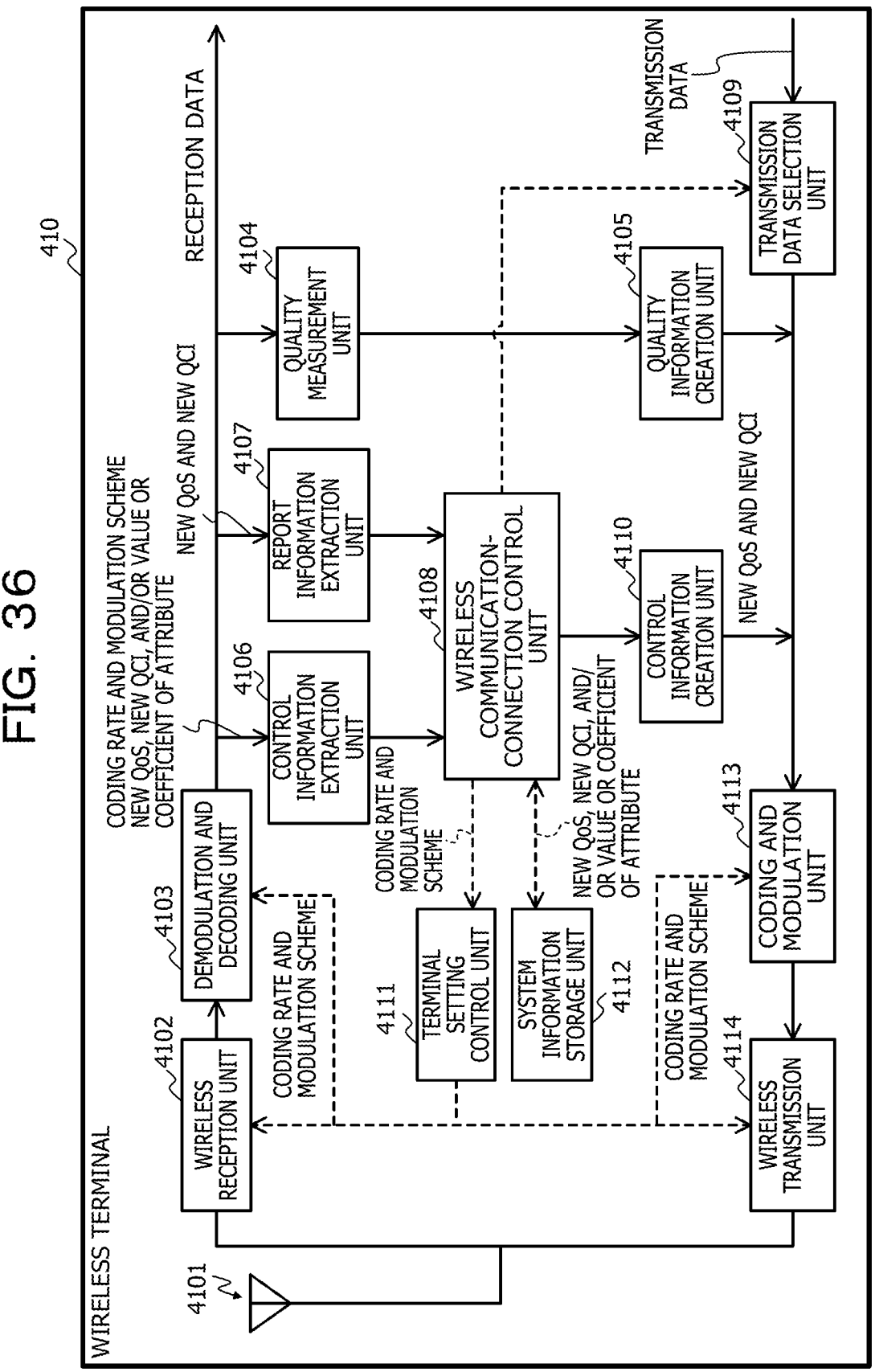
FIG. 36 is a block diagram illustrating an example of a functional configuration of a wireless terminal.

FIG. 31 is a block diagram illustrating an example of a functional configuration of a PCRF 460. FIG. 32 is a block diagram illustrating an example of a functional configuration of a PGW 450. FIG. 33 is a block diagram illustrating an example of a functional configuration of an SGW 440. FIG. 34 is a block diagram illustrating an example of a functional configuration of an MME 430. FIG. 35 is a block diagram illustrating an example of a functional configuration of a base station 420. FIG. 36 is a block diagram illustrating an example of a functional configuration of a wireless terminal 410.

The wireless terminal 410 is an example of the wireless terminal 110, the UE 210, and the UE 310. The base station 420 is an example of the base station 120, the eNB 220, and the eNB 320. The MME 430 is an example of the control apparatus 130, the MME 230, and the MME 330. The SGW 440 is an example of the control apparatus 130, the SGW 240, and the SGW 340. The PGW 450 is an example of the control apparatus 130, the PGW 250, and the PGW 350. The PCRF 460 is an example of the control apparatus 130, the PCRF 260, and the PCRF 360.

It is noted that in the wireless communication systems 100, 100A, and 200 according to the first implementation mode of the first embodiment and the second embodiment, "new QoS, new QCI" in the description "new QoS, new QCI, and/or value or coefficient of attribute" in FIGS. 31 to 36" may be a target. On the other hand, in the wireless communication systems 100, 100A, and 300 according to the second implementation mode of the first embodiment and the third embodiment, "new QoS, new QCI" may be a target, and "new QoS, new QCI" and "value or coefficient of attribute" may be a target.

(PCRF)

The PCRF 460, as illustrated in FIG. 31, may include a billing control unit 461 and a policy control unit 462 in an exemplary manner. The billing control unit 461 performs control relating to billing.

The policy control unit 462 may store and manage the information relating to the service class and the information relating to the subclass. Furthermore, the policy control unit 462 may notify a PCEF 451 (refer to FIG. 32) of the PGW 450 and a BBERF (not illustrated in FIG. 33) of the SGW 440 of these pieces of information and/or communication channel control information. Accordingly, the communication channel control such as the bearer setup is performed.

Processing by the policy control unit 462 may include processing relating to policy control in the wireless communication system, and may include processing that is performed by the control apparatus 130 in the first embodiment, the PCRF 260 in the second embodiment, or the PCRF 360 in the third embodiment, or any combination thereof.

It is noted that the policy control unit 462 may perform the processing described above in cooperation with the billing control unit 461.

(PGW)

The PGW 450, as illustrated in FIG. 32, may the PCEF 451 and a communication channel control unit 452 in an exemplary manner.

The PCEF 451 may notify the MME 430 of control information relating to a service class.

It is noted that the PCEF 451 may include functions of a Local Mobility Anchor (LMA) and a Mobility Access Gateway (MAG). The LMA provides an anchor function in mobility control. Furthermore, instead of the wireless terminal 410, the MAG performs establishment or release of communication path between the MAG itself and the LMA.

(SGW)

The SGW 440, as illustrated in FIG. 33, may include a communication channel control unit 441 in an exemplary manner. It is noted that the SGW 440 may include a function of the BBERF.

The communication connection control unit 441 performs various controls on a signal that is transmitted and received to and from the base station 420, the MME 430, the PGW 450, or the PCRF 460. Processing by the communication connection control unit 441 may include processing relating to user data control, and may include that is performed by the control apparatus 130 in the first embodiment, the SGW 240 in the second embodiment, or the SGW 340 in the third embodiment, or any combination thereof.

For example, based on the control information that is notified by the PCRF 460, the communication channel control unit 441 may set up a bearer, and may transfer user data, which is received from the PGW 450, to the base station 420.

(MME)

The MME 430, as illustrated in FIG. 34, may include a communication connection control unit 431 in an exemplary manner.

The communication connection control unit 431 performs various controls on a signal that is transmitted and received to and from the base station 420, the SGW 440, the PGW 450, or the PCRF 460. Processing by the communication connection control unit 431 may include processing relating to control of a communication channel in the wireless communication system, and may include processing that is performed by the control apparatus 130 in the first embodiment, the MME 230 in the second embodiment, or the MME 330 in the third embodiment, or any combination thereof.

For example, the communication-line control unit 431 may control a wireless communication-line in accordance with the notification, and may notify the base station 420 and the SGW 440 of the control information relating to the service class.

As described above, each of the policy control unit 462 of the PCRF 460, at least one of the PCEF 451 and the communication channel control unit 452 of the PGW 450, the communication channel control unit 441 of the SGW 440, and the communication channel control unit 431 of the MME 430 is an example of a transfer unit, a setting unit, a control unit, and a storage unit.

The transfer unit transfers the information relating to the service class relating to the transfer of the operation signal for operating the device, or the information relating to the service class relating to the transfer of the signal, to the base station 420. The setting unit sets the service class relating to the transfer of the operation signal for operating the device, or the service class relating to the transfer of the signal.

The control unit controls the transfer of the operation signal using the service class that is set. Alternatively, the control unit controls the transfer of the operation signal, using the service class that is set, and the information relating to the attribute value that is different from the value of at least one attribute which is set to be in the service class, the information being added to the operation signal for operating the device. A plurality of attribute values are stored in the storage unit.

(Base Station)

The base station 420, as illustrated in FIG. 35, may include an antenna 4201, a wireless reception unit 4202, a demodulation and decoding unit 4203, a quality information extraction unit 4204, a quality measurement unit 4205, a wireless communication channel control unit 4206, and a base station setting control unit 4207, in an exemplary manner. Furthermore, the base station 420 may include a control information creation unit 4208, a system information management and storage unit 4209, a notification information creation unit 4210, a transmission data selection unit 4211, a coding and modulation unit 4212, and a wireless transmission unit 4213.

The antenna 4201 receives an uplink (UL) wireless signal that is transmitted from the wireless terminal 410. Furthermore, the antenna 4201 transmits downlink (DL) wireless signal to the wireless terminal 410.

The wireless reception unit 4202 performs given reception processing on UL reception signal that is received from the antenna 4201, and acquires a UL signal that is transmitted by the wireless terminal 410. The reception processing may include low-noise amplification of the reception signal, frequency conversion (down-convert) into a baseband frequency, gain adjustment, and the like, in an exemplary manner.

The demodulation and decoding unit 4203 performs demodulation and decoding of a signal that is acquired in the wireless reception unit 4202, using a coding rate and a modulation scheme that is input from the base station setting control unit 4207.

The quality information extraction unit 4204 extracts a result of measurement of quality of a downlink wireless communication channel, for example, CQI or RSRP, from a signal that is received from the wireless terminal 410.

The quality measurement unit 4205 measures the uplink wireless communication channel quality using the signal that is received from the wireless terminal 410, for example, a pilot.

The wireless communication channel control unit 4206 performs various processing operations relating to the control signal or the user data that is transmitted and received to and from the wireless terminal 410, the MME 430, or the SGW 440. Processing by the wireless communication channel control unit 4206 may include processing that is performed by the base station 120 in the first embodiment, the eNB 220 in the second embodiment, or the eNB 320 in the third embodiment, or any combination thereof.

For example, the wireless communication channel control unit 4206 performs downlink or uplink scheduling using the result of the measurement of the downlink or uplink wireless communication channel quality that is input from the quality information extraction unit 4204 or the quality measurement unit 4205.

Furthermore, the wireless communication channel control unit 4206 acquires the information relating to the service class or the attribute thereof, or the information relating to the subclass, such as the value or the coefficient of the attribute, from the control information that is received from the MME 430 or the SGW 440. A service class that is newly added may be included in the service class.

The control information creation unit 4208 creates wireless communication channel control information that includes a radio resource, a modulation scheme, and a coding rate which is used for the selected wireless terminal 410 and the downlink data transfer. It is noted that information relating to a new service class and/or information relating to a subclass such as a value or a coefficient of an attribute may be included in the wireless communication channel control information.

Transmission data (for example, user data) from the base station 420 to the wireless terminal 410 is transmitted based on the wireless communication channel control information. For example, in a case where a plurality of pieces of user data are present, the user data that is to be transmitted is selected in the transmission data selection unit 4211, based on a service class or a subclass in accordance with a service or a packet.

The base station setting control unit 4207 performs setting of the wireless reception unit 4202, the demodulation and decoding unit 4203, the coding and modulation unit 4212, and the wireless transmission unit 4213 using the coding rate and the modulation scheme that are input from the wireless communication channel control unit 4206.

For example, the information relating to the service class and/or the information relating to the subclass, such as the value or the coefficient of the attribute, which is acquired from the control information (or notification information) that is received from the MME 430 or the SGW 440, may be stored in the system information management and storage unit 4209, for example, in a tabular format. The system information management and storage unit 4209 is an example of the storage unit in which a plurality of attribute values are stored.

The notification information creation unit 4210 creates the notification information (may be referred to as "broadcast information") that includes the information relating to the service class or the attribute thereof, using the information that is stored in the system information management and storage unit 4209. The notification information is transmitted to the wireless terminal 410.

It is noted that the wireless communication channel control unit 4206 may check an attribute that is set for a service or a packet, based on the information within the system information management and storage unit 4209.

The coding and modulation unit 4212 performs coding and modulation of DL user data or the control signal that is to be transmitted to the wireless terminal 410, using the coding rate and the modulation scheme that are input from the base station setting control unit 4207.

The wireless transmission unit 4213 performs given transmission processing on a DL signal and thus generates a transmission signal, and outputs the generated transmission signal to the antenna 4201. Frequency conversion (up-convert) into a wireless frequency, power amplification, and the like may be included, in an exemplary manner, in the transmission processing.

As described above, the wireless communication channel control unit 4206 is an example of the setting unit that sets the service class relating to the transfer of the operation signal for operating the device, or the service class relating to the transfer of the signal. Furthermore, the wireless communication channel control unit 4206 is an example of the control unit that controls the transfer of the operation signal using the service class that is set. Alternatively, the wireless communication channel control unit 4206 may control the transfer of the operation signal, using that service class that is set, and the information relating to the attribute value that is different from the value of at least one attribute that is set to be in the service class, the information being added to the operation signal for operating the device.

In this manner, in the PCRF 460, the PGW 450, the SGW 440, the MME 430, and the base station 420, a bearer or a path from a transmission source of a signal to a transmission destination of the signal may be set up according to a service class and/or an attribute thereof. Furthermore, the bearer or the path is set up in this manner, and then, according to the information relating to the service class, a priority, a transfer speed, a transfer delay, or the like of each of the data packets that are to be transferred may be controlled. That is, the communication connection control may be performed. It is noted that because the Internet is between the base station 420 to which a transmission source makes a connection and the base station 420 to which a transmission destination makes a connection, the data packet may be an IP packet.

(Wireless Terminal)

The wireless terminal 410, as illustrated in FIG. 36, may include an antenna 4101, a wireless reception unit 4102, a demodulation and decoding unit 4103, a quality measurement unit 4104, a quality information creation unit 4105, a control information extraction unit 4106, and a notification information extraction unit 4107, in an exemplary manner. Furthermore, the wireless terminal 410 may include a wireless communication channel control unit 4108, a transmission data selection unit 4109, a control information creation unit 4110, a terminal setting control unit 4111, a system information storage unit 4112, a coding and modulation unit 4113, and a wireless transmission unit 4114.

The antenna 4101 receives a DL wireless signal that is transmitted from the base station 420. Furthermore, the antenna 4101 transmits a UL wireless signal to the base station 420.

The wireless reception unit 4102 performs given reception processing on DL reception signal that is received in the antenna 4101, and acquires a DL signal that is transmitted by the base station 420. The reception processing may include the low-noise amplification of the reception signal, the frequency conversion (down-convert) into a baseband frequency, the gain adjustment, and the like, in an exemplary manner.

The demodulation and decoding unit 4103 performs demodulation and decoding of a signal that is acquired in the wireless reception unit 4102, using a coding rate and a modulation scheme that is input from the terminal setting control unit 4111.

The quality measurement unit 4104 measures the downlink wireless channel quality using a signal that is received from the base station 420, for example, a pilot.

The quality information creation unit 4105 creates the wireless channel quality information based on the result of the measurement of the downlink wireless channel quality. The wireless channel quality information is notified to the base station 420.

The control information extraction unit 4106 extracts the control information from the signal that is received from the base station 420. Uplink wireless communication channel control information, for example, may be included in the control information. In addition to the coding rate and the modulation scheme, information relating to a service class that is newly added or an attribute thereof, and/or information relating to a subclass or an attribute value thereof may be included in the uplink wireless communication channel control information.

The notification information extraction unit 4107 extracts the notification information from the signal that is received from the base station 420. The information relating to the service class that is newly added or the attribute thereof may be included in the notification information.

The wireless communication channel control unit 4108 performs various processing operations relating to the control signal or the user data that is transmitted and received to and from the base station 420. Processing that is performed by the wireless terminal 110 in the first embodiment, the UE 210 in the second embodiment, or the UE 310 in the third embodiments, or any combination thereof may be in the wireless communication channel control unit 4108.

For example, the wireless communication channel control unit 4108 controls the uplink data (for example, the user data) transfer using the uplink wireless communication channel control information or the notification information, which is input from the control information extraction unit 4106 or the notification information extraction unit 4107, respectively.

Furthermore, in addition to the coding rate and the modulation scheme, the wireless communication channel control unit 4108 acquires the information relating to the service class or the attribute thereof, and/or the information relating to the subclass, such as the value or the coefficient of the attribute, from the uplink wireless communication channel control information. A service class that is newly added may be included in the service class.

Transmission data (for example, the user data) from the wireless terminal 410 to the base station 420 is transmitted based on the uplink wireless communication channel control information. For example, in the case where a plurality of pieces of user data are present, the user data that is to be transmitted is selected in the transmission data selection unit 4109, based on a service class or a subclass in accordance with a service or a packet.

The control information creation unit 4110 creates uplink control information. The information relating to the service class that is newly added or the attribute value thereof, and/or a higher-layer control signal such as a subclass or an attribute thereof may be included in the uplink control signal. In this case, the wireless terminal 410 that is a transmission source may set these pieces of information, or may perform a setting request (for example, a request that setting to "QCI"="5" is desirable) to a higher-layer apparatus.

Furthermore, the control information for a bearer setup for Point to Point (P2P) communication, or Non Access Stratum (NAS) signaling such as position registration may be included in the control information.

Moreover, the control information (which is specified as RRC and of which an example is an RRCConnectionReconfiguration response), such as a wireless communication channel setting that is transferred over Physical Downlink Shared Channel (PDSCH) may be included in the control information. It is noted that RRCConnectionReconfiguration is a response to an RRCConnectionReconfiguration message and that the RRCConnectionReconfiguration message is one piece of control information in a communication channel connection.

Furthermore, L2 signaling, such as MAC CE that accompanies uplink transmission data, may be included in the control information. For example, a Buffer Status Report (BSR) in the MAC CE is information indicating an amount of data that stays in the wireless terminal 410, and may be used for an amount of transmission data for uplink, or transmission allocation for uplink, in the scheduling in the base station 420. It is noted that a Random Access Response in a Random Access Procedure, or the like may be included.

Moreover, as the L1/L2 signaling, information, such as ACK/NACK, or CQI, that is transferred over Physical Uplink Control Channel (PUCCH) may be included. Furthermore, as the L1/L2 signaling, a Scheduling Request (SR) (a request for the uplink transmission allocation), or a Rank Indicator (RI) and a Precoding Matrix Indicator (PMI), and the like, which are involved in Multiple-Input Multiple-Output (MIMO) may be included.

The terminal setting control unit 4111 performs setting of the wireless reception unit 4102, the demodulation and decoding unit 4103, the coding and modulation unit 4113, and the wireless transmission unit 4114, using the coding rate and the modulation scheme that are input from the wireless communication channel control unit 4108.

For example, the information relating to the service class and/or the information relating to the subclass, such as the value or the coefficient of the attribute, which is acquired from the control information (or the notification information) that is received from the base station 420, may be stored in the system information storage unit 4112, for example, in a tabular format. The new service class according to the second embodiment may be included in the service class.

It is noted that the wireless communication channel control unit 4108 may check an attribute that is set for a service or a packet, based on the information within the system information storage unit 4112.

The coding and modulation unit 4113 performs coding and modulation of UL user data or the control signal that is to be transmitted to the base station 420, using the coding rate and the modulation scheme that are input from the terminal setting control unit 4111.

The wireless transmission unit 4114 performs given transmission processing on a UL signal and thus generates a transmission signal, and outputs the generated transmission signal to the antenna 4101. The frequency conversion (up-convert) into a wireless frequency, the power amplification, and the like may be included, in an exemplary manner, in the transmission processing.

As described above, the wireless communication channel control unit 4108 is an example of the reception unit that receives the information relating to the service class from the base station 420.

Furthermore, the wireless communication channel control unit 4108 is an example of the transmission unit that transmits the operation signal to the base station 420 using the service class relating to the transfer of the operation signal for operating the device. Alternatively, the wireless communication channel control unit 4108 is an example of the control unit that adds the information relating to the attribute value that is different from the value of at least one attribute that is set to be in the service class relating to the transfer of the signal, to the operation signal for operating the device, and transmits the operation signal, to which the information is added, to the base station 420.

In this manner, in the base station 420 and the wireless terminal 410, a priority, a transfer speed, a transfer delay, or the like of the transfer of a packet (for example, a MAC PDU) for wireless transfer may be controlled. For example, in the base station 420 and the wireless terminal 410, scheduling for the uplink and downlink data transfer may be performed on a per-packet basis, based on the information relating to an attribute value, such as a value or a coefficient of an attribute, that is added to a packet. Furthermore, according to a priority that is based on a service class or a subclass, selection of a transmission packet may be performed.

[4-2] Example of a Hardware Configuration

Figure 37:
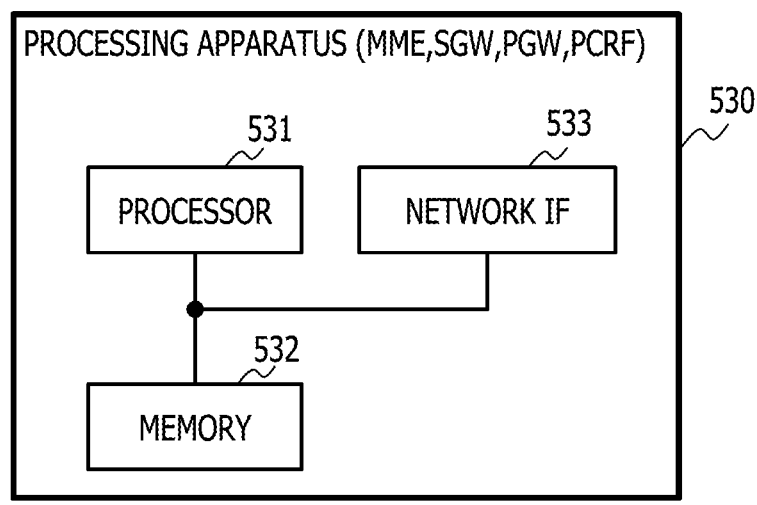
FIG. 37 is a block diagram illustrating an example of a hardware configuration of the PCRF, the PGW, the SGW, or the MME, which is illustrated in FIGS. 31 to 34.
Figure 38:
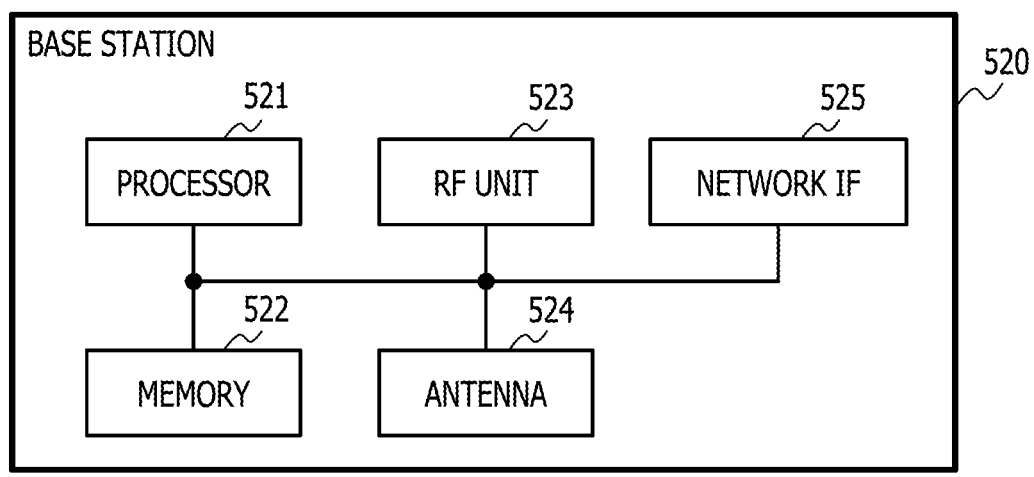
FIG. 38 is a block diagram illustrating an example of a hardware configuration of the base station that is illustrated in FIG. 35.
Figure 39:
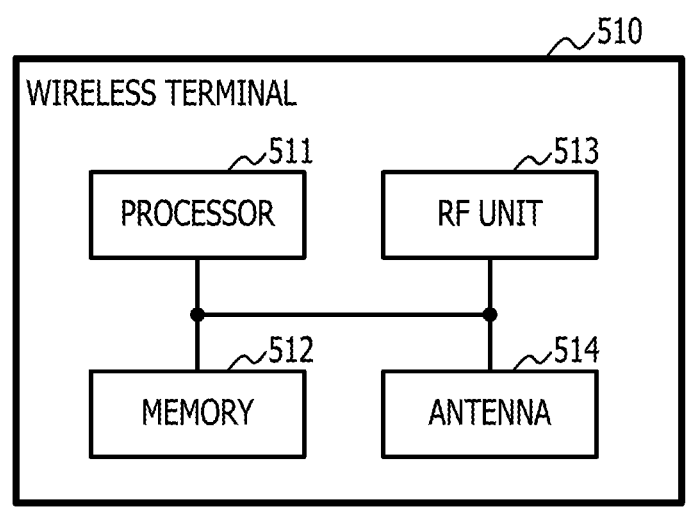
FIG. 39 is a block diagram illustrating an example of a hardware configuration of the wireless terminal that is illustrated in FIG. 36.

FIG. 37 is a block diagram illustrating an example of a hardware configuration of the PCRF 460, the PGW 450, the SGW 440, or the MME 430, which is illustrated in FIGS. 31 to 34. FIG. 38 is a block diagram illustrating an example of a hardware configuration of the base station 420 that is illustrated in FIG. 35. FIG. 39 is a block diagram illustrating an example of a hardware configuration of the wireless terminal 410 that is illustrated in FIG. 36.

(MME, the SGW, and the PGW)

Any one of the PCRF 460, the PGW 450, the SGW 440, and the MME 430, which are illustrated in FIGS. 31 to 34 may include the same hardware configuration. Therefore, the hardware configuration of each of the PCRF 460, the PGW 450, the SGW 440, and the MME 430 will be described below with a processing apparatus 530 being given as an example.

As illustrated in FIG. 37, the processing apparatus 530 may include a processor 531, a memory 532, and a network IF 533, in an exemplary manner. It is noted that IF is abbreviation of Interface.

The processor 531 performs various controls or arithmetic operations. The processor 531 may be connected to each block within the processing apparatus 530 with a bus in a manner that mutual communication is possible. It is noted that as processors 531, an integrated circuit (IC) is given such as a Central Processing Unit (CPU), a Micro Processing Unit (MPU), an Application Specific Integrated Circuit (ASIC), or a Field Programmable Gate Array (FPGA).

The memory 532 is an example of hardware in which a control signal or various pieces of data such as user data, and information such as a program are stored. As the memory 532, at least one of a volatile memory and a nonvolatile memory may be used. Examples of the volatile memory include a Random Access Memory (RAM). Examples of the nonvolatile memory include a Read Only Memory (ROM), a flash memory, and an Electrically Erasable Programmable Read-Only Memory (EEPROM).

The network IF 533 is an example of a communication network that makes a connection to a network, for example, a packet network core or an external network, and performs communication control, and the like.

For example, with the network IF 533, the MME 430 may perform signal transmission and reception between each of the base station 420, the SGW 440, and the PGW 450. Furthermore, with the network IF 533, the SGW 440 may perform the signal transmission and reception between each of the base station 420, the MME 430, the PGW 450, and the PCRF 460. Moreover, with the network IF 533, the PGW 450 may perform the signal transmission and reception between each of the MME 430, the SGW 440, and the PCRF 460, and an external network. Furthermore, with the network IF 533, the PCRF 460 may perform the signal transmission and reception between the SGW 440 and PGW 450.

For example, the processor 531 may realize functions of the PCRF 460, the PGW 450, the SGW 440, and the MME 430, which are illustrated in FIGS. 31 to 34, by executing the program that is stored in the memory 532.

As an example, functions of the billing control unit 461 and the policy control unit 462 of the PCRF 460, which are illustrated in FIG. 31, may be realized by the processor 531. Alternatively, functions of the PCEF 451 and the communication connection control unit 452 of the PGW 450, which are illustrated in FIG. 32, may be realized by the processor 531. Alternatively, functions of the communication connection control unit 441, which is illustrated in FIG. 33, and BBERF, which is not illustrated, of the SGW 440, may be realized by the processor 531. Alternatively, a function of the communication connection control unit 431 of the MME 430, which is illustrated in FIG. 34, may be realized by the processor 531.

(Base Station)

As illustrated in FIG. 38, a base station 520 may include a processor 521, a memory 522, an RF unit 523, an antenna 524, and a network IF 525, in an exemplary manner. It is noted that RF is abbreviation of Radio Frequency.

The processor 521 performs various controls or arithmetic operations. The processor 521 may be connected to each block within the base station 520 with a bus in a manner that mutual communication is possible. It is noted that as the processor 521, an integrated circuit (IC) is given such as a CPU, an MPU, an ASIC, or an FPGA.

The memory 522 is an example of hardware in which a control signal or various pieces of data such as user data, and information such as a program are stored. As an example, at least one or several of the functions of the system information management and storage unit 4209, which is illustrated in FIG. 35, may be realized by the memory 522. As the memory 522, at least one of a volatile memory and a nonvolatile memory may be used. Examples of the volatile memory include a RAM. Examples of the nonvolatile memory include a ROM, a flash memory, and an EEPROM.

An RF unit 523, for example, may include an RF circuit. The RF unit 523 is an example of the wireless reception unit 4202 and the wireless transmission unit 4213, which are illustrated in FIG. 35. The antenna 524 is an example of the antenna 4201, which is illustrated in FIG. 35, and may perform transmission and reception of a wireless signal to and from the wireless terminal 510.

The network IF 525 is an example of the communication interface that makes a connection to a network, for example, a packet core network, and performs communication control or the like, and may transmission and reception of a signal to and from the processing apparatus 530 (refer to FIG. 37).

For example, the processor 521 executes the program that is stored in the memory 522, and thus may realize a function of the base station 420 that is illustrated in FIG. 35. As an example, the quality information extraction unit 4204, the quality measurement unit 4205, the wireless communication channel control unit 4206, the base station setting control unit 4207, the control information creation unit 4208, and the notification information creation unit 4210, which are illustrated in FIG. 35, may be realized by the processor 521. Furthermore, functions of at least one or more of the wireless reception unit 4202, the system information management and storage unit 4209, the transmission data selection unit 4211, and the wireless transmission unit 4213 may be realized by the processor 521.

(Wireless Terminal)

As illustrated in FIG. 39, the wireless terminal 510 may include a processor 511, a memory 512, an RF unit 513, and an antenna 514 in an exemplary manner.

The processor 511 performs various controls or arithmetic operations. The processor 511 may be connected to each block within the wireless terminal 510 with a bus in a manner that mutual communication is possible. It is noted that as the processor 511, an integrated circuit (IC) is given such as a CPU, an MPU, an ASIC, or an FPGA.

The memory 512 is an example of hardware in which a control signal or various pieces of data such as user data, and information such as a program are stored. As an example, at least one or several of the functions of the system information storage unit 4112, which is illustrated in FIG. 36, may be realized by the memory 512. As the memory 512, at least one of a volatile memory and a nonvolatile memory may be used. Examples of the volatile memory include a RAM. Examples of the nonvolatile memory include a ROM, a flash memory, and an EEPROM.

The RF unit 513, for example, may include an RF circuit. The RF unit 513 is an example of the wireless reception unit 4102 and the wireless transmission unit 4114, which are illustrated in FIG. 36. The antenna 514 is an example of the antenna 4101, which is illustrated in FIG. 36, and may perform transmission and reception of a wireless signal to and from the base station 520 (refer to FIG. 38).

For example, the processor 511 may realize a function of the wireless terminal 410, which is illustrated in FIG. 36, by executing the program that is stored in the memory 512. As an example, functions of the quality measurement unit 4104, the quality information creation unit 4105, the control information extraction unit 4106, the notification information extraction unit 4107, the wireless communication channel control unit 4108, the control information creation unit 4110, and the terminal setting control unit 4111, which are illustrated in FIG. 36, may be realized by the processor 511. Furthermore, functions of one or several of the wireless reception unit 4102, the transmission data selection unit 4109, and the wireless transmission unit 4114 may be realized by the processor 511.

[5] Others

Various modifications to the first to third embodiment described above may be made, for implementation, in the scope that does not depart from the nature and gist thereof. Each configuration or each processing according to each of the embodiments may be selected or discarded if desirable, or configurations and processing operations may be suitably combined.

For example, in the second embodiment, as in the wireless communication system 100A according to the first embodiment, which is illustrated in FIGS. 3 and 4, the UE 210-2 may perform wireless communication with any other eNB that is different from the eNB 220. Furthermore, in the third embodiment, as in the wireless communication system 100A according to the first embodiment, which is illustrated in FIGS. 3 and 4, the UE 310-2 may perform wireless communication with any other eNB that is different from the eNB 320.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control apparatus comprising:
a network interface configured to perform transmission and reception of a signal;
a controller coupled to the network interface, the controller configured to
execute a transfer processing that includes transferring service class information indicating a service class for controlling a remote device, wherein the service class for controlling the remote device includes a Packet Delay Budget (PDB) which is set to 5 milliseconds,
execute a setting processing that includes setting the service class to transmission of an operation signal for controlling the remote device, and
execute a control processing that includes controlling transfer of the operation signal via the network interface by using the service class, wherein the control processing is configured to control the transfer of the operation signal by using the service class that is set to the operation signal and information that is added to the operation signal,
wherein the information relates to a first attribute value,
wherein the first attribute value either is a value that is different from a value of at least one attribute associated with the service class or is a coefficient that applies to the value of the at least one attribute associated with the service class.

2. The control apparatus according to claim 1, wherein the service class is associated with an attribute of a transfer delay, a transfer error rate, a guaranteed transfer speed, or any combination thereof.

3. The control apparatus according to claim 1, wherein the service class has a guaranteed bit rate and a priority higher than at least one other radio service, wherein the at least one other radio service also has the guaranteed bit rate.

* * * * *